US012669599B2

(12) United States Patent
Imaizumi et al.

(10) Patent No.: US 12,669,599 B2
(45) Date of Patent: Jun. 30, 2026

(54) SINKAGE PREDICTION DEVICE AND SINKAGE PREDICTION METHOD

(71) Applicant: Synspective Inc., Tokyo (JP)

(72) Inventors: Tomoyuki Imaizumi, Tokyo (JP); Aito Fujita, Tokyo (JP); Goh Fukuda, Tokyo (JP); Shuji Fujimaru, Tokyo (JP); Pradeep Kambhampati, Tokyo (JP); Michael Tehranian, Tokyo (JP)

(73) Assignee: Synspective Inc., Tokyo (JP)

( * ) Notice: Subject to any disclaimer, the term of this patent is extended or adjusted under 35 U.S.C. 154(b) by 401 days.

(21) Appl. No.: 18/262,593

(22) PCT Filed: Jan. 25, 2022

(86) PCT No.: PCT/JP2022/002557
§ 371 (c)(1),
(2) Date: Jul. 24, 2023

(87) PCT Pub. No.: WO2022/163612
PCT Pub. Date: Aug. 4, 2022

(65) Prior Publication Data
US 2024/0427012 A1    Dec. 26, 2024

(30) Foreign Application Priority Data
Jan. 29, 2021    (WO) .................. PCT/JP2021/003312

(51) Int. Cl.
*G01S 13/90* (2006.01)
*G01B 15/06* (2006.01)
(52) U.S. Cl.
CPC .............. *G01S 13/90* (2013.01); *G01B 15/06* (2013.01)
(58) Field of Classification Search
CPC ................................ G01S 13/90; G01B 15/06
(Continued)

(56) References Cited

U.S. PATENT DOCUMENTS

| | | | | | |
|---|---|---|---|---|---|
| 9,483,839 | B1 * | 11/2016 | Kwon | .................. | G01S 13/865 |
| 10,198,632 | B2 * | 2/2019 | Sasaki | .................. | G06V 20/13 |

(Continued)

FOREIGN PATENT DOCUMENTS

| | | | | | |
|---|---|---|---|---|---|
| CN | 102927934 | A | * | 2/2013 | ............. G01B 15/16 |
| CN | 102938095 | A | | 2/2013 | |

(Continued)

OTHER PUBLICATIONS

Jin-Woo Kim, et al.: "Ongoing Deformation of Sinkholies in Wink, Texas, Observed by Time-Series Sentinel-1A SAR Interferometry (Preliminary Results)", Remote Sensing, vol. 8, No. 313, 2016, pp. 1-11.

(Continued)

*Primary Examiner* — Nuzhat Pervin
(74) *Attorney, Agent, or Firm* — POLSINELLI PC

(57) ABSTRACT

There is provided a sinkage prediction device including: a variation data acquisition unit 10 analyzing time-series observation data measured by using an earth observation technology and acquiring horizontal direction variation data which is data indicating a horizontal direction variation on a ground surface; and a sinkage prediction unit 20 determining, based on the acquired horizontal direction variation data, whether at least one of the variation in the time axis and the variation in the space axis on the ground surface is in a predetermined state and predicting a location on the ground surface indicating the variation determined to be in the predetermined state as a potential sinkage location where there is a possibility of occurrence of sinkage, wherein it is possible to predict the location where the sinkage may be likely to occur by determining, based on the horizontal direction variation data obtained by analyzing the observation data measured by using the earth observation technology, whether the variation in the time axis or the variation (Continued)

in the space axis on the ground surface is in the predetermined state, by using the predetermined state related to the variation in the horizontal direction viewed on the ground surface where there is a sign that the sinkage is likely to occur as a determination criterion.

10 Claims, 12 Drawing Sheets

(58) Field of Classification Search
USPC .......................................................... 342/25
See application file for complete search history.

(56) References Cited

U.S. PATENT DOCUMENTS

| | | | | |
|---|---|---|---|---|
| 10,436,893 | B2 * | 10/2019 | Lee | G01S 13/917 |
| 11,754,704 | B2 * | 9/2023 | Ikefuji | G01S 13/9004 |
| | | | | 342/25 A |
| 12,270,892 | B2 * | 4/2025 | Choi | G01S 13/0209 |
| 2019/0378296 | A1 * | 12/2019 | Zheng | G06T 7/73 |

| | | | | |
|---|---|---|---|---|
| 2020/0320731 | A1 * | 10/2020 | Sheen | G06F 3/04815 |
| 2021/0072376 | A1 * | 3/2021 | Ikefuji | G01S 13/003 |
| 2022/0221577 | A1 * | 7/2022 | Ikefuji | G01S 13/904 |
| 2022/0260672 | A1 * | 8/2022 | Zhang | G01S 13/52 |
| 2025/0146816 | A1 * | 5/2025 | Jumonji | G01B 21/32 |

FOREIGN PATENT DOCUMENTS

| | | | | | |
|---|---|---|---|---|---|
| CN | 102927934 | B | | 1/2015 | |
| CN | 109738892 | A | * | 5/2019 | G01S 13/90 |
| CN | 109738892 | B | | 6/2020 | |
| CN | 111780660 | A | | 10/2020 | |
| CN | 112184902 | A | | 1/2021 | |
| JP | 2004226388 | A | * | 8/2004 | G01S 13/90 |
| JP | 7294529 | B2 | * | 6/2023 | G01D 21/00 |

OTHER PUBLICATIONS

Japanese Office Action issued Nov. 4, 2025 for corresponding Japanese Application No. 2022-578390.
European Search Report issued on Nov. 25, 2024 for counterpart European Application No. 22745833.8.

* cited by examiner

HORIZONTAL DIRECTION
VARIATION DATA (a) LoS DIRECTION OF
NORTH-BOUND TRAJECTORY (b) LoS DIRECTION OF
SOUTH-BOUND TRAJECTORY

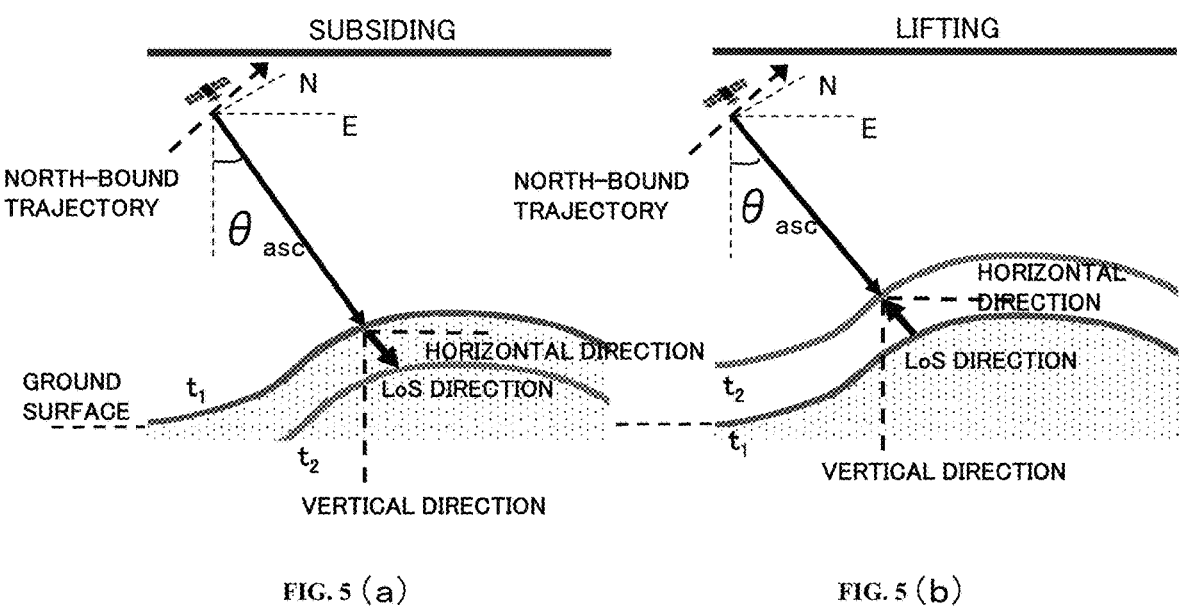
FIG. 5 (a)                    FIG. 5 (b)
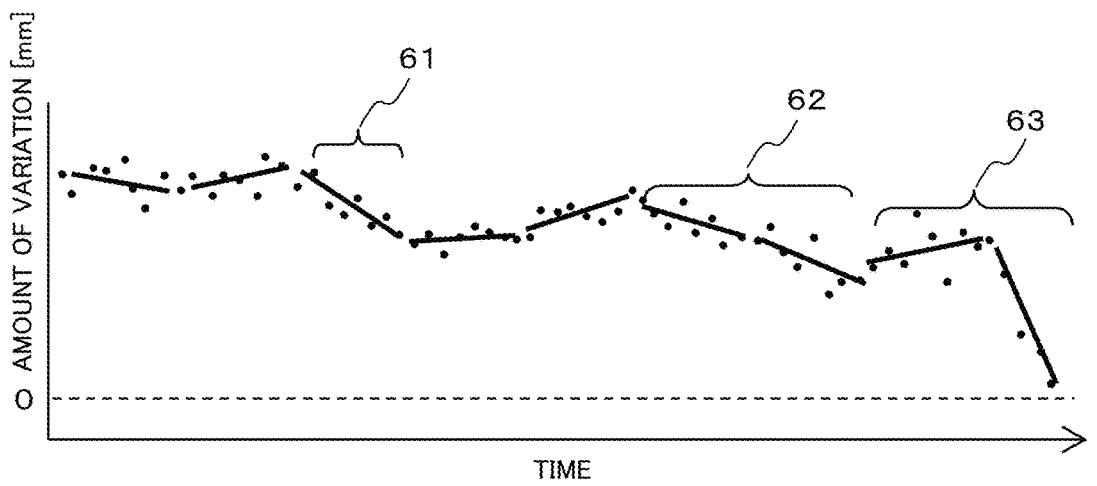
FIG. 6

HORIZONTAL DIRECTION
VARIATION DATA

SINKAGE PREDICTION DEVICE AND SINKAGE PREDICTION METHOD

CROSS REFERENCE TO RELATED APPLICATIONS

This application is a National Phase filing under 35 U.S.C. § 371 of PCT/JP2022/002557, filed on Jan. 25, 2022, which claims the benefit of Japanese Application No. PCT/JP2021/003312, filed Jan. 29, 2021; the entire contents of which are hereby incorporated by reference.

TECHNICAL FIELD

The present invention relates to a sinkage prediction device and a sinkage prediction method, and more particularly to a technology for predicting potential sinkage locations based on observation data measured by using an earth observation technology.

BACKGROUND ART

InSAR (Interferometric Synthetic Aperture Radar) using SAR (Synthetic Aperture Radar), which is one of earth observation technologies from the space, is a technology that makes it possible to detect deformation on the ground surface and structures without requiring an observation point on the ground. By using a technology called PSInSAR (PS: Permanent Scatterer) among the InSARs, it is possible to grasp the trend of ground variation over a long period of time.

However, in a case where a monitoring area is wide and time-series results are constantly being updated, it is troublesome to extract risk locations with potential dangers such as sinkages, and manual operations can lead to mistakes. For this reason, it is desired to develop a technology for narrowing down and presenting risk locations where there is a possibility of sinkage of the ground.

In the related art, there are known literatures that analyze two-dimensional (horizontal and vertical) time-series deformation progressing into a sinkhole (refer to, for example, NPL 1). The literature also mentions warning of future sinkhole progression when an expanding sinkage area of the ground is detected through time-series InSAR analysis.

NPL 1: "Ongoing Deformation of Sinkholes in Wink, Texas, Observed by Time-Series Sentinel-1A SAR Interferometry (Preliminary Results)" (Jin-Woo Kim, Zhong Lu, Kimberly Degrandpre; Published: 8 Apr. 2016)

SUMMARY OF INVENTION

Technical Problem

However, Non-Patent Literature 1 only discusses results of analysis of an actually occurred sinkhole and deformation of the ground in progress in the vicinity thereof and does not disclose a method for predicting the occurrence of the sinkhole.

The object of the invention is to make it possible to predict locations where there is a possibility of sinkage based on observation data measured by using an earth observation technology.

Solution to Problem

In order to solve the above-described problems, the invention analyzes time-series observation data measured by using an earth observation technology, acquires horizontal direction variation data which is data indicating a variation in a horizontal direction on a ground surface, determines, based on the acquired horizontal direction variation data, whether at least one of a variation in a time axis and a variation in a space axis on the ground surface is in a predetermined state, and predicts a location on the ground surface indicating the variation determined to be in the predetermined state as a potential sinkage location where there is a possibility of occurrence of sinkage.

Advantageous Effects of Invention

According to the invention configured as described above, it is possible to predict the location where the sinkage may be likely to occur by determining, based on the horizontal direction variation data obtained by analyzing the observation data measured by using the earth observation technology, whether the variation in the time axis or the variation in the space axis on the ground surface is in the predetermined state, by using the predetermined state related to the variation in the horizontal direction viewed on the ground surface where there is a sign that the sinkage is likely to occur as a determination criterion.

BRIEF DESCRIPTION OF DRAWINGS

FIG. 5 is a diagram illustrating the north-bound LoS variation data as an example.

FIG. 6 is a diagram describing processing contents of a time-axis filtering unit according to the first embodiment.

DESCRIPTION OF EMBODIMENTS

First Embodiment

Figure 1:
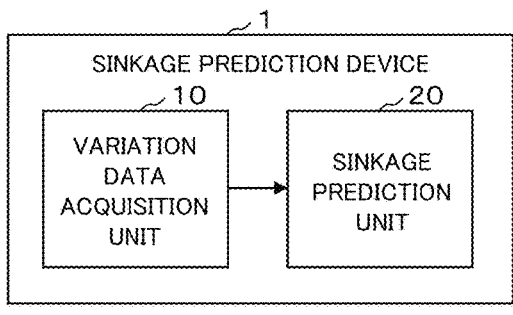
FIG. 1 is a block diagram illustrating a functional configuration example of a sinkage prediction device according to an embodiment.

Hereinafter, a first embodiment of the invention will be described with reference to the drawings. FIG. 1 is a block diagram illustrating a functional configuration example of a sinkage prediction device according to the present embodiment. As illustrated in FIG. 1, a sinkage prediction device 1 of the present embodiment includes a variation data acquisition unit 10 and a sinkage prediction unit 20 as functional configurations. Each of the functional blocks 10 and 20 can be configured by any one of hardware, DSP (Digital Signal Processor), and software. For example, when configured by software, each of the functional blocks 10 and 20 is actually configured with a CPU, a RAM, a ROM, and the like of a computer and is implemented by operation of a program stored in a recording medium such as a RAM, a ROM, a hard disk, or a semiconductor memory.

The variation data acquisition unit 10 analyzes time-series observation data measured by using earth observation technology and acquires at least data (hereinafter referred to as horizontal direction variation data) indicating horizontal time-series variations on a ground surface. In the present embodiment, an SAR (Synthetic Aperture Radar) is used as an earth observation technology. However, this is only an example and is not limited thereto. The horizontal direction variation data acquired in the present embodiment is data indicating variation in an east-west direction when a left-right direction or a vertical direction on a map displayed on a screen is defined as a north-south direction. A specific configuration and processing contents of the variation data acquisition unit 10 will be described later with reference to FIG. 2.

The sinkage prediction unit 20 determines, based on the horizontal direction variation data acquired by the variation data acquisition unit 10, whether the variation in the time axis on the ground surface or the variation in the space-axis on the ground surface is in a predetermined state and predicts a location on the ground surface indicating the variation determined to be in the predetermined state as a potential sinkage location where there is a possibility of occurrence of a sinkage. The predetermined state is a state related to the horizontal direction variation viewed on the ground surface where there is a sign that a sinkage is likely to occur, and the potential sinkage location is predicted by using this state as a determination criterion to monitor a variation state in the time axis on the ground surface or a variation state in the space-axis on the ground surface. A specific configuration and processing contents of the sinkage prediction unit 20 will be described later with reference to FIG. 3.

Figure 2:
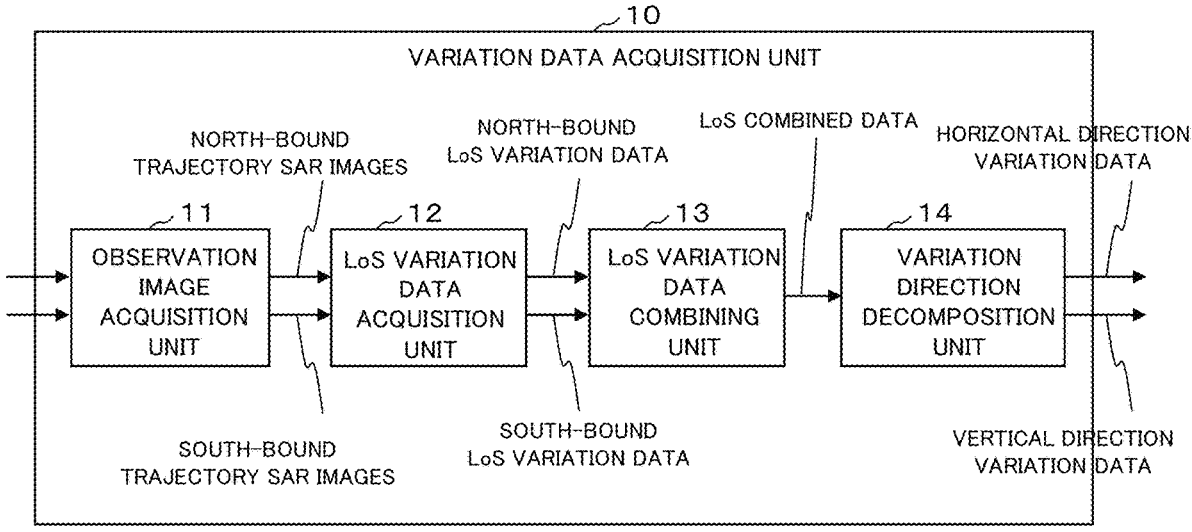
FIG. 2 is a block diagram illustrating a specific functional configuration example of a variation data acquisition unit according to the embodiment.

FIG. 2 is a block diagram illustrating a specific functional configuration example of the variation data acquisition unit

10. As illustrated in FIG. 2, the variation data acquisition unit 10 includes an observation image acquisition unit 11, an LoS variation data acquisition unit 12, an LoS variation data detection unit 13, and a variation direction decomposition unit 14 as specific functional configurations.

The observation image acquisition unit 11 acquires image data (hereinafter referred to as a SAR image) observed by using a combined aperture radar. The observation image acquisition unit 11 acquires, for example, a time-series SAR image stored in a storage medium (not illustrated) through daily observations. A satellite equipped with the combined aperture radar observes every point on the earth from two directions of a north-bound (ascending) trajectory and a south-bound (descending) trajectory, from a predetermined trajectory of the satellite. The observation image acquisition unit 11 acquires SAR images (hereinafter referred to as north-bound trajectory SAR images) observed by a satellite in the north-bound trajectory and SAR images (hereinafter referred to as south-bound trajectory SAR images) observed by a satellite in the south-bound trajectory.

The LoS variation data acquisition unit 12 analyzes the time-series observation data (north-bound trajectory SAR images and south-bound trajectory SAR images) acquired by the observation image acquisition unit 11 and acquires data (hereafter referred to as the north-bound LoS variation data) indicating the variation on the ground surface in the line-of-sight (LoS) when viewed at the ground surface from the satellite in the north-bound trajectory which is a satellite traveling direction and data (hereinafter referred to as the south-bound LoS variation data) indicating the variation in the line-of-sight direction when the ground surface is viewed from the satellite in the south-bound trajectory which is a satellite traveling direction. Known InSAR analysis can be used as the analysis performed by the LoS variation data acquisition unit 12.

Figure 4:
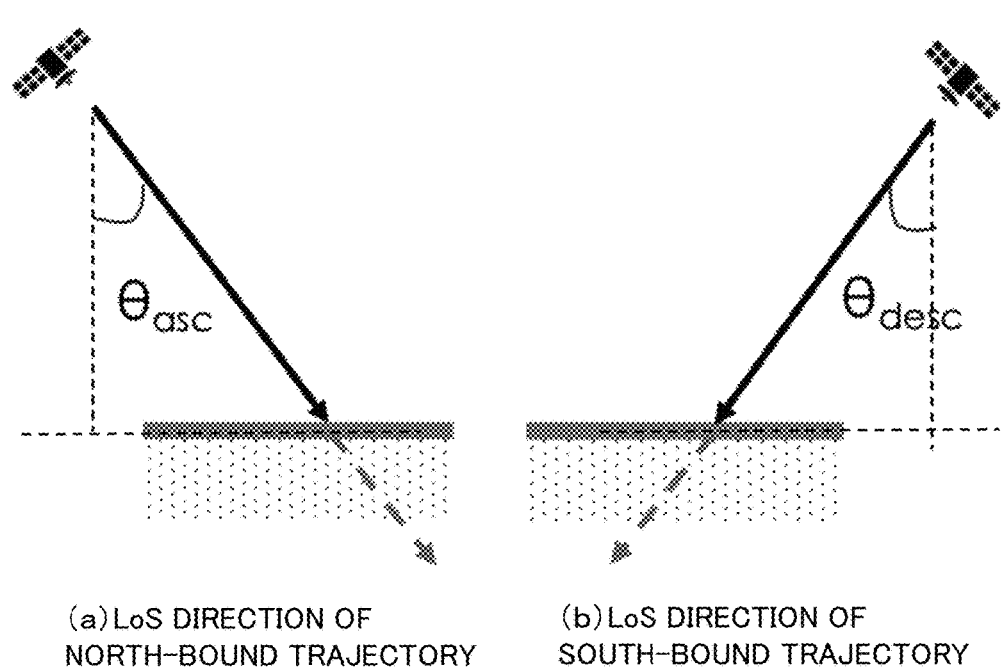
FIG. 4 is a diagram describing an LoS direction.

FIG. 4 is a diagram illustrating LoS which is the line of sight when the ground surface is viewed from the satellite in the satellite traveling direction. As illustrated in FIG. 4, radar waves emitted from the satellite are not perpendicular to the ground surface, but rather the radar waves are irradiated at slightly different incident angles $\theta$asc and $\theta$desc in the north-bound trajectory illustrated in FIG. 4($a$) and the south-bound trajectory illustrated in FIG. 4($b$). As a result, in the InSAR analysis, the amount of variation in the viewing direction of the satellite is obtained instead of the amount of variation in the vertical direction on the ground surface.

FIG. 5 is a diagram illustrating an example of the north-bound LoS variation data. FIG. 5($a$) illustrates the north-bound LoS variation data when the ground surface is subsided from time $t_1$ to $t_2$ (when the distance between the satellite and the ground surface is extended), and FIG. 5($b$) illustrates the north-bound LoS variation data when the ground surface is uplifted from time $t_1$ to $t_2$ (when the distance between the satellite and the ground surface is shortened). An example of the south-bound LoS variation data can be expressed in the LoS direction for the south-bound trajectory of FIG. 4($b$) in the same manner as the example in which the ground surface of the north-bound LoS variation data illustrated in FIG. 5 is subsided or uplifted.

The LoS variation data detection unit 13 detects the north-bound LoS variation data and the south-bound LoS variation data acquired by the LoS variation data acquisition unit 12 to replace the data with variation data for each predetermined unit time and for each predetermined unit area. The LoS variation data detection unit 13 performs matching in the time axis and the space-axis between the north-bound LoS variation data and the south-bound LoS variation data to detect the matched north-bound LoS variation data and south-bound LoS variation data.

The north-bound LoS variation data and the south-bound LoS variation data may not match in the time-axis direction and the space-axis direction. Therefore, the LoS variation data detection unit 13 sets a threshold value in the time-axis direction, and when there are the north-bound LoS variation data and the south-bound LoS variation data that can be regarded to be the same within the range of the threshold value, the LoS variation data detection unit 13 matches and detects the north-bound LoS variation data and the south-bound LoS variation data. Similarly, the LoS variation data detection unit 13 sets a threshold value in the space-axis direction, and when there are the north-bound LoS variation data and the south-bound LoS variation data that can be regarded to be the same within the range of the threshold value, the LoS variation data detection unit 13 matches and detects the north-bound LoS variation data and the south-bound LoS variation data. Herein, the matching denotes a process of determining whether there is a point where the north-bound LoS variation data and the south-bound LoS variation data can be regarded to be the same within the threshold value range set in the time-axis direction or the space-axis direction.

In the present embodiment, matching conditions are set loosely by setting at least one of the threshold value of the time-axis and the threshold value of the space-axis that are used in matching to be larger than a predetermined value. The predetermined value is, for example, a threshold value generally used in the Sentinel-1 satellite that acquires satellite data in a frequency band called a C band for measurements requiring strictness and accuracy. As an example, the threshold value for the time-axis is set to 11 days which is generally used for the Sentinel-1 satellite, and the threshold value for the space-axis is set to a rectangular area of 20 m square, which is larger than a generally-used 5 m square. The initial values are not limited to this example, and for example, the initial values can be similarly set for satellites capable of acquiring satellite data in an X band or an L band as other frequency bands.

The LoS variation data detection unit 13 detects the south-bound LoS variation data that can be regarded to be the same to the north-bound LoS variation data within a time range of 11 days and within a distance difference of 20 m square by using, for example, the north-bound LoS variation data as master data and the south-bound LoS variation data as slave data and registers the north-bound LoS variation data and the south-bound LoS variation data matched for every predetermined unit time (for example, for every 11 days) and every predetermined unit area (for example, for each rectangular area of 20 m square) by registering the north-bound LoS variation data and the south-bound LoS variation data as the north-bound LoS variation data and the south-bound LoS variation data only when the south-bound LoS variation data can be detected. The predetermined unit time and the predetermined unit area used herein are specified based on the north-bound LoS variation data used as the master data. When matching is not possible, that is, when the SAR image cannot be acquired by the satellite or when a point where the north-bound LoS variation data and the south-bound LoS variation data can be regarded to be the same cannot be detected, for the predetermined unit area that cannot be matched, the north-bound LoS variation data and the south-bound LoS variation data are lost, but since the matching conditions are set to be looser than usual, it is possible to obtain the north-bound LoS variation data and the south-bound LoS variation data in the larger number of predetermined unit areas.

For example, the LoS variation data detection unit 13 detects the north-bound LoS variation data and the south-bound LoS variation data matched in the predetermined unit time T for the area of interest by using one predetermined unit area as the area of interest and detects the north-bound LoS variation data and the south-bound LoS variation data matched in the next predetermined unit time T+1 in the same area of interest.

The variation direction decomposition unit 14 decomposes the north-bound LoS variation data and the south-bound LoS variation data generated as data for each predetermined unit time and for each predetermined unit area by the LoS variation data detection unit 13 into the horizontal direction variation data that is data indicating the horizontal direction variation and the vertical direction variation data that is data indicating the vertical direction variation.

Herein, the variation direction decomposition unit 14 decomposes the north-bound LoS variation data and the south-bound LoS variation data in the predetermined unit time T into the horizontal direction and the vertical direction, respectively, and similarly, decomposes the north-bound LoS variation data and the south-bound LoS variation data in the predetermined unit time T+1 into the horizontal direction and the vertical direction, respectively. By calculating the north-bound LoS variation data and the south-bound LoS variation data in the horizontal direction in the predetermined unit time T and the north-bound LoS variation data and the south-bound LoS variation data in the horizontal direction in the predetermined unit time T+1, the amount of variation in the horizontal direction is obtained as the horizontal direction variation data. By calculating the north-bound LoS variation data and the south-bound LoS variation data in the vertical direction in the predetermined unit time T and the north-bound LoS variation data and the south-bound LoS variation data in the vertical direction in the predetermined unit time T+1, the amount of variation in the vertical direction is obtained as the vertical direction variation data.

At this time, the variation direction decomposition unit 14 assumes that the variation on the ground surface in the horizontal north-south direction does not occur and, after that, decomposes each of the north-bound LoS variation data and the south-bound LoS variation data into the variation data in the vertical direction and the horizontal direction. Herein, the case where the satellite rotates from the North Pole to the South Pole is indicated as a satellite traveling direction, and since a radar is irradiated in the east-west direction that is perpendicular to the satellite traveling direction (north-south direction), the variations in the east-west direction on the horizontal plane can be detected, but since it is physically impossible to detect the variations in the satellite traveling direction (north-south direction on the horizontal plane), and thus, the satellite traveling direction is ignored. In addition, when the satellite rotates in the equatorial trajectory, since the satellite to rotate in the horizontal east-west direction, since the radar is irradiated in the north-south direction, which is the right angle, the variation on the horizontal plane in the south-north direction can be detected, but since it is physically impossible to acquire the variations in the satellite traveling direction (east-west direction on the horizontal plane), and thus, the satellite traveling direction is ignored.

The horizontal direction variation data generated by the variation direction decomposition unit 14 is time-series data indicating the amount of variation on the ground surface in the horizontal direction (the amount of variation in either the east direction or the west direction). The vertical direction variation data is time-series data that indicates the amount of variation on the ground surface (the amount of variation in either the direction of subsiding or the direction of uplifting). The variation direction decomposition unit 14 decomposes the north-bound LoS variation data and the south-bound LoS variation data obtained by the LoS variation data detection unit 13 as described above into the horizontal direction and the vertical direction and sets the decomposed data into the horizontal direction variation data and the vertical direction variation data.

Figure 3:
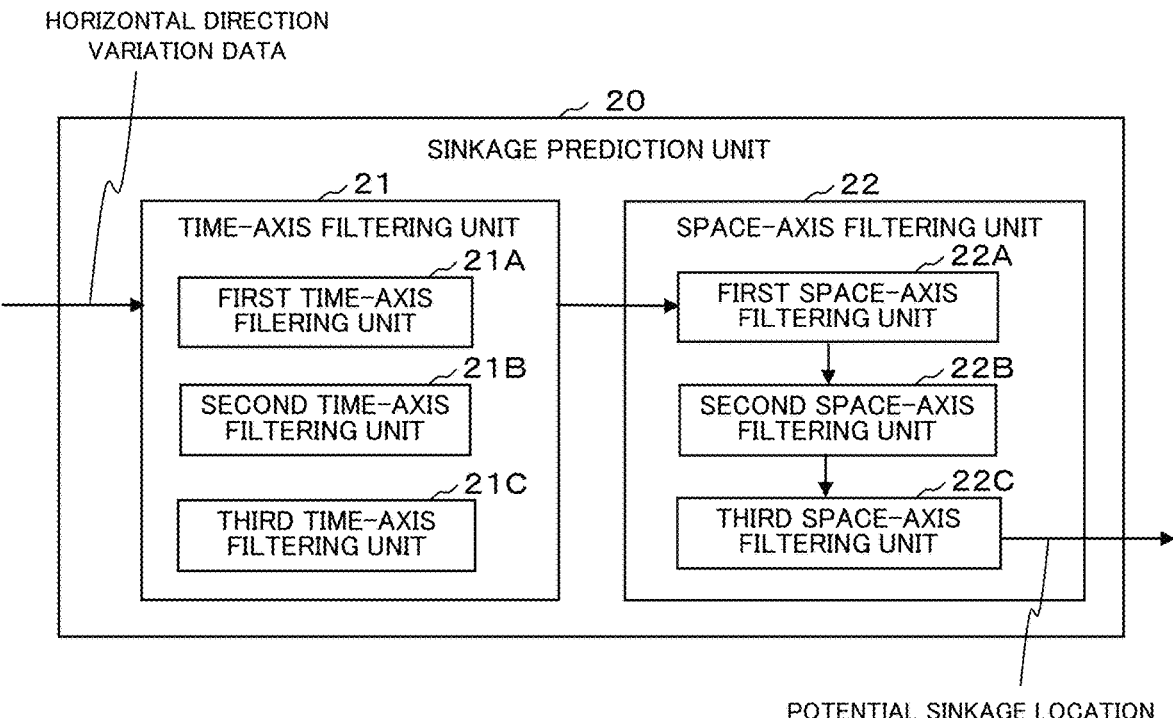
FIG. 3 is a block diagram illustrating a specific functional configuration example of a sinkage prediction unit according to a first embodiment.

FIG. 3 is a block diagram illustrating a specific functional configuration example of the sinkage prediction unit 20 according to the first embodiment. As illustrated in FIG. 3, the sinkage prediction unit 20 includes a time-axis filtering unit 21 and a space-axis filtering unit 22 as specific functional configurations. The time-axis filtering unit 21 includes first to third time-axis filtering units 21A to 21C. In addition, the space-axis filtering unit 22 includes first to third space-axis filtering units 22A to 22C.

FIG. 6 is a diagram illustrating processing contents of the time-axis filtering unit 21. FIG. 6 illustrates a change in the amount of variation on the ground surface in one predetermined unit area for each predetermined unit time (every 11 days) and illustrates the amount of variation due to the horizontal direction variation data with each of circled dots acquired every 11 days. In the following, the first to third time-axis filtering units 21A to 21C will be described with reference to FIG. 6.

The first time-axis filtering unit 21A determines, based on the horizontal direction variation data acquired by the variation data acquisition unit 10 for each predetermined unit time and each predetermined unit area, whether the variation in the time axis on the ground surface is in the first state in which the change in the amount of variation in one direction within a predetermined period exceeds a first threshold value. Then, when it is determined that the variation in the time axis on the ground surface is in the first state, the first time-axis filtering unit 21A extracts the predetermined unit area for which the horizontal direction variation data is acquired as a candidate for a location (hereinafter referred to as a sinkage candidate location) in which the sinkage is likely to occur.

The predetermined period can be, for example, eight times the predetermined unit time (88 days). In this case, the first state can be said to be a state in which the change in the amount of variation in either the east direction or the west direction is increased beyond the first threshold value within a relatively short period of 88 days. In the example of FIG. 6, the amount of variation is linearly approximated in units of 88 days, and when the difference between the amount of variation at the start point and the amount of variation at the end point of the straight line is larger than the first threshold value, it is determined to be in the first state in which a change in the amount of variation in one direction within a predetermined period exceeds the first threshold value. It is noted that the length of the predetermined period set here is an example, and the invention is not limited thereto.

The second time-axis filtering unit 21B determines, based on the horizontal direction variation data acquired by the variation data acquisition unit 10 for each predetermined unit time and for each predetermined unit area, whether the variation in the time axis on the ground surface is in the second state in which the change in the amount of variation in one direction within a period longer than the predetermined period used in making a determination as to the first state exceeds a second threshold value. Then, when it is determined that the variation in the time axis on the ground surface is in the second state, the second time-axis filtering unit 21B extracts the predetermined unit area from which the horizontal direction variation data is acquired as a sinkage candidate location.

A period longer than the predetermined period can be, for example, a period (176 days) twice as long as the predetermined period. In this case, the second state can be said to be a state in which the change in the amount of variation in either the east direction or the west direction has increased beyond the second threshold value during a relatively long period of 176 days. In the example of FIG. 6, two continuous straight lines obtained by linearly approximating the amount of variation in units of 88 days are connected, and when the difference between the amount of variation at the starting point and the amount of variation at the end point of the connecting straight line is larger than the second threshold value, it is determined to be in the second state that the change in the amount of variation in one direction in a period longer than the predetermined period exceeds the second threshold value.

It is noted that, an example of connecting two straight lines approximated in units of the predetermined period has been described, but the invention is not limited thereto. For example, linear approximation may be performed in units of a period twice as long as the predetermined period. In addition, herein, an example in which a period twice as long as the predetermined period is used as the period longer than the predetermined period has been described, but the invention is not limited thereto. That is, any period longer than the predetermined period may be used. In addition, the starting point of the period can be arbitrarily determined. For example, it may be determined whether the change in the amount of variation from the start of observation exceeds the second threshold value.

The third time-axis filtering unit 21C determines, based on the horizontal direction variation data acquired by the variation data acquisition unit 10 for each predetermined unit time and for each predetermined unit area, whether the variation in the time axis on the ground surface is in the third state in which the variation trend is different compared to the past variation trend. Then, when it is determined that the variation in the time axis on the ground surface is in the third state, the third time-axis filtering unit 21C extracts the predetermined unit area for which the horizontal direction variation data is acquired as a sinkage candidate location.

In the example illustrated in FIG. 6, the portion indicated by reference numeral 61 is determined to be in the first state and the third state, the portion indicated by reference numeral 62 is determined to be in the second state and the third state, and the portion indicated by reference numeral 63 is determined to be in the first state, the second state, and the third state. The time-axis filtering unit 21 extracts, for example, the predetermined unit area satisfying the first state, the second state, and the third state with an OR condition as the sinkage candidate location. Alternatively, the time-axis filtering unit 21 may extract only the predetermined unit area satisfying the first state, the second state, and the third state with an AND condition as the sinkage candidate location.

It is noted that, although the example in which the time-axis filtering unit 21 makes a determination as to all of the first state, the second state, and the third state has been described herein, the invention is not limited thereto. That is, as to one or two of the first state, the second state, and the third state, the time-axis filtering unit 21 may determine whether it is in such a state.

Figure 7:
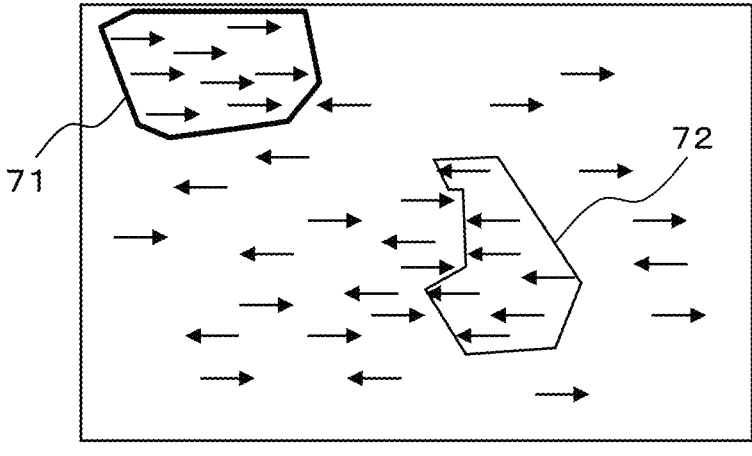
FIG. 7 is a diagram describing processing contents of a space-axis filtering unit according to the first embodiment.
Figure 7:
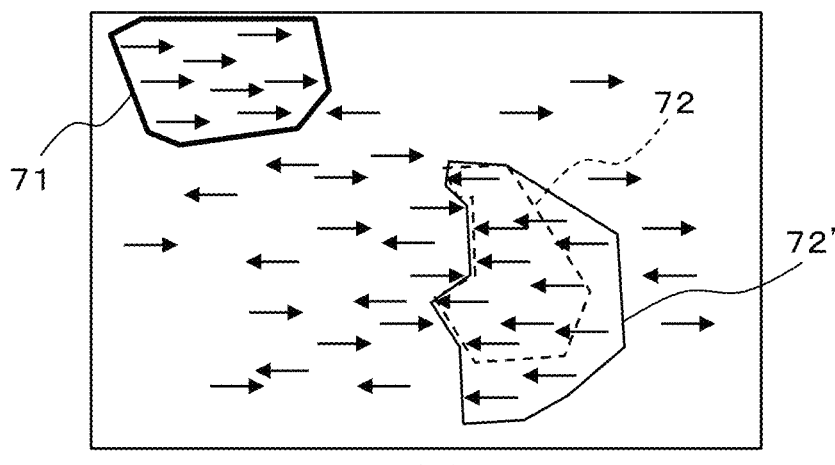
Figure 7:
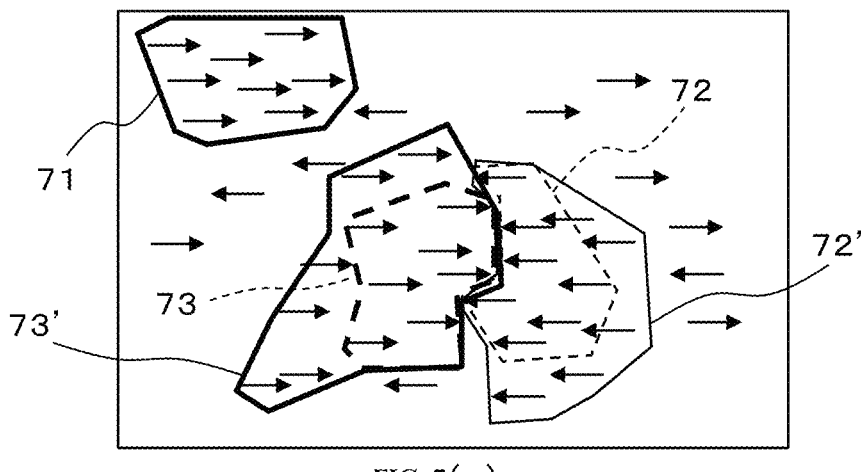

FIG. 7 is a diagram illustrating processing contents of the space-axis filtering unit 22 according to the first embodiment. FIG. 7 illustrates the variation on the ground surface in the east direction and the west direction in the plurality of predetermined unit areas when the ground surface of a certain area is viewed from above, the orientation of the arrow (the horizontal direction variation data) indicates the variation direction (the east direction and the west direction) on the ground surface, and the amount of variation in the predetermined unit time can be indicated by the difference in the size of the arrow and the color of the arrow. However, for the illustration simplification, the arrows are all the same size and color.

FIG. 7 illustrates only the horizontal direction variation data of the sinkage candidate locations extracted by the time-axis filtering unit 21. In other words, the location where no horizontal direction variation data is illustrated is the location where the matching by the LoS variation data detection unit 13 is not satisfied and the north-bound LoS variation data and the south-bound LoS variation data are missing or the location that is not extracted as the sinkage candidate location by the time-axis filtering unit 21. In the following, the first to third space-axis filtering units 22A to 22C will be described with reference to FIG. 7.

The first space-axis filtering unit 22A determines, based on the horizontal direction variation data obtained by the variation data acquisition unit 10 for each predetermined unit time and for each predetermined unit area, whether it is in the first state in which the plurality of predetermined unit areas indicating the same variation direction in the same predetermined unit time exist at positions at intervals within the predetermined distance from each other. Then, the first space-axis filtering unit 22A narrows down all or a portion of the grouping area formed in the plurality of predetermined unit areas in which the variation in the space axis on the ground surface satisfies the first state as the sinkage candidate locations.

In FIG. 7(*a*), a portion denoted by reference numeral 71 indicates the east direction with the same variation direction and indicates the grouping area formed in the plurality of predetermined unit areas existing at the position at intervals within the predetermined distance from each other. In addition, a portion denoted by reference numeral 72 indicates the west direction with the same variation direction and indicates the grouping area formed in the plurality of predetermined unit areas existing at the position at intervals within the predetermined distance from each other. Grouping areas 71 and 72 are formed in the set of only the predetermined unit areas having the same variation direction. It is noted that, the grouping area may be formed only when the number of predetermined unit areas having the same variation direction and existing at the position at intervals within the predetermined distance from each other is the predetermined number or more.

The first space-axis filtering unit 22A extracts, for example, all of the plurality of predetermined unit areas included in the grouping areas 71 and 72 as the sinkage candidate locations. Alternatively, the first space-axis filtering unit 22A extract may a portion of the predetermined unit areas included in the grouping areas 71 and 72 as the sinkage candidate locations. A portion of the predetermined unit area can be, for example, the predetermined unit area in contact with the leading edge of the grouping areas 71 and 72 in the variation direction.

The second space-axis filtering unit 22B further determines, based on the horizontal direction variation data acquired by the variation data acquisition unit 10 for each predetermined unit time and for each predetermined unit area, whether the variation in the space axis on the ground surface is in the second state in which the grouping area spatially expands in time series and narrows down all or a portion of the expanding grouping area as the sinkage candidate locations.

It is assumed that the grouping areas 71 and 72 illustrated in FIG. 7(*b*) are the same as those illustrated in FIG. 7(*a*) and are formed at a predetermined unit time T. In addition, it is also assumed that a grouping area 72' is formed at the next predetermined unit time T+1. In FIG. 7(*b*), the first grouping area 71 does not expand or shrink over a time from the predetermined unit time T to the next predetermined unit time T+1, while the second grouping areas 72 and 72' illustrates the state of expanding spatially. In this case, the second space-axis filtering unit 22B extracts only the second grouping area 72' as the sinkage candidate location.

The third space-axis filtering unit 22C further determines, based on the horizontal direction variation data acquired by the variation data acquisition unit 10 for each predetermined unit time and for each predetermined unit area, whether the variation in the space axis on the ground surface is in the third state in which the grouping areas related to the variation direction in mutually opposite orientations are adjacent to each other, and predicts all or a portion of the adjacent grouping areas as the potential sinkage locations. Herein, the third space-axis filtering unit 22C may predict the boundary portion between the adjacent grouping areas as the potential sinkage location.

The grouping areas 71, 72, and 72' illustrated in FIG. 7(*c*) are the same as those illustrated in FIG. 7(*b*). FIG. 7(*c*) illustrates a third grouping area 73 formed in a predetermined unit time T and a grouping area 73' obtained by spatially expanding the grouping area 73 in the next predetermined unit time T+1. The second grouping area 72' formed by the west direction variation data group and the third grouping area 73' formed by the east direction variation data group are in a state of being adjacent to each other in mutually opposite orientations. Therefore, in this case, the third space-axis filtering unit 22C predicts, for example, the boundary portion between the grouping areas 72' and 73' as the potential sinkage location.

It is noted that, although the example in which the space-axis filtering unit 22 makes a determination as to all of the first state, the second state, and the third state has been described here, the invention is not limited thereto. That is, as to only the first state, only the first and second states, or only the first and third states, the space-axis filtering unit 22 may determine whether it is in such a state and predict the location satisfying all of the determined conditions as the potential sinkage location. In addition, when the determination is made by combining the plurality of conditions, the warning may be issued as the potential sinkage location satisfying all of the conditions, and the sinkage candidate location satisfying only some of the conditions may be presented as an elapsed observation target location in the future.

For example, in a case where as to only the first state and the third state, it is determined whether it is in such a state, in FIG. 7(*c*), the third space-axis filtering unit 22C can predict, for example, the boundary portion between the grouping areas 72 and 73 where the second grouping area 72 formed by the west direction variation data group and the third grouping area 73 formed by the east direction variation data group formed in a certain predetermined unit time T are in a state of being adjacent to each other in mutually opposite orientations, as the potential sinkage location. However, by making a determination as to all of the first to third states, it is possible to predict the locations with the higher possibility of sinkage.

Figure 8:
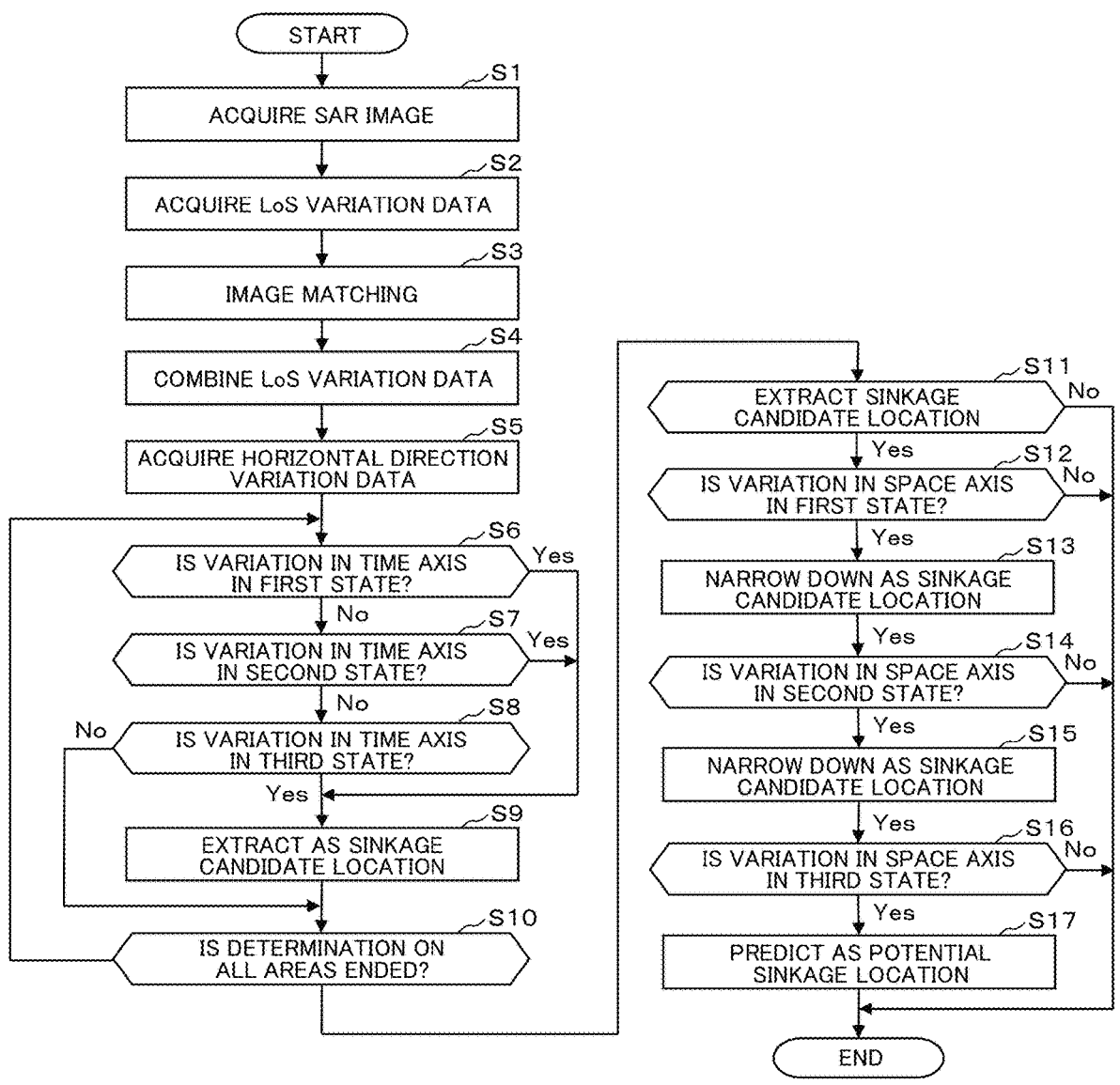
FIG. 8 is a flowchart illustrating an operation example of the sinkage prediction device according to the first embodiment.

FIG. 8 is a flowchart illustrating an operation example of the sinkage prediction device according to the first embodiment configured as above. In FIG. 8, first, the observation image acquisition unit 11 acquires the time-series north-bound trajectory SAR images and the time-series south-bound trajectory SAR images stored in the storage medium (not illustrated) (step S1). The LoS variation data acquisition unit 12 acquires the north-bound LoS variation data and the south-bound LoS variation data by performing known InSAR analysis on the time-series SAR images acquired by the observation image acquisition unit 11 (step S2).

Next, the LoS variation data detection unit 13 performs time-axis and space-axis matching between the north-bound trajectory LoS variation data and the south-bound trajectory LoS variation data (step S3). Then, the LoS variation data detection unit 13 acquires the north-bound trajectory LoS variation data and the south-bound trajectory LoS variation data by detecting the north-bound LoS variation data and the south-bound LoS variation data that are considered to be matching (step S4). Furthermore, the variation direction decomposition unit 14 acquires the horizontal direction variation data by horizontally and vertically decomposing the north-bound trajectory LoS variation data and the south-bound trajectory LoS variation data detected by the LoS variation data detection unit 13 (step S5).

Next, the first time-axis filtering unit 21A determines, based on the acquired horizontal direction variation data for each predetermined unit time for one predetermined unit area among direction variation data acquired by the variation direction decomposition unit 14 for each predetermined unit time and for each predetermined unit area, whether the variation in the time axis on the ground surface is in the first state in which the change in the amount of variation in one direction within the predetermined period exceeds the first threshold value (step S6). Herein, when it is determined that the variation in the time axis on the ground surface is in the first state, the first time-axis filtering unit 21A extracts the predetermined unit area as the sinkage candidate location (step S9).

On the other hand, when the first time-axis filtering unit 21A determines that the variation in the time axis on the ground surface is not in the first state, after that, the second time-axis filtering unit 21B determines, based on the horizontal direction variation data acquired for each predetermined unit time in the same predetermined unit area, whether the variation in the time axis on the ground surface is in the second state in which the change in the amount of variation in one direction for the period longer than the predetermined period exceeds the second threshold value (step S7). Herein, when it is determined that the variation in the time axis on the ground surface is in the second state, the second time-axis filtering unit 21B extracts the predetermined unit area as the sinkage candidate location (step S9).

On the other hand, when the second time-axis filtering unit 21B determines that the variation in the time axis on the ground surface is not in the second state, after that, the third time-axis filtering unit 21C determines, based on the horizontal direction variation data acquired for each predetermined unit time in the same predetermined unit area, whether the variation in the time axis on the ground surface is in the third state in which the variation trend is different compared to the past variation trend (step S8). Herein, when it is determined that the variation in the time axis on the ground surface is in the third state, the third time-axis filtering unit 21C extracts the predetermined unit area as the sinkage candidate location (step S9).

On the other hand, when the third time-axis filtering unit 21C determines that the variation in the time axis on the ground surface is not in the third state, or after executing the process of step S9, the time-axis filtering unit 21 determines whether determination related to the state of the variation in the time axis is performed for all the predetermined unit areas with respect to the horizontal direction variation data acquired for each predetermined unit area by the variation direction decomposition unit 14 (step S10). Then, when there remains the predetermined unit area that has not been determined yet, the process returns to step S6. On the other hand, when the determination related to the variation state of the time axis has been completed for all the predetermined unit areas, the process proceeds to step S11.

In step S11, the space-axis filtering unit 22 determines whether the time-axis filtering unit 21 has extracted at least one predetermined unit area of the sinkage candidate location. When even one sinkage candidate location has not been extracted, the process of the flowchart illustrated in FIG. 8 is ended. On the other hand, when at least one sinkage candidate location has been extracted, the space-axis filtering unit 22 performs the following process on the predetermined unit area of the sinkage candidate location extracted by the time-axis filtering unit 21 as the determination target.

First, the first space-axis filtering unit 22A determines, based on the horizontal direction variation data acquired by the variation direction decomposition unit 14 for each predetermined unit time and for each predetermined unit area, whether the predetermined unit areas are in the first state in which the plurality of predetermined unit area indicating the same variation direction in the same predetermined unit time exist at the position at intervals within the predetermined distance from each other (step S12).

Herein, when the variation in the space axis on the ground surface does not satisfy the first state, the process of the flowchart illustrated in FIG. 8 is ended. On the other hand, when the variation in the space axis on the ground surface satisfies the first state, the first space-axis filtering unit 22A narrows down all or a portion of the grouping area formed in the plurality of predetermined unit areas satisfying the first state as the sinkage candidate location (step S13).

Next, the second space-axis filtering unit 22B further determines, based on the horizontal direction variation data acquired by the variation data acquisition unit 10 for each predetermined unit time and for each predetermined unit area, whether the variation in the space axis on the ground surface is in the second state in which the grouping area is spatially expanded in time series (step S14).

Herein, when the variation in the space axis on the ground surface does not satisfy the second state, the process of the flowchart illustrated in FIG. 8 is ended. On the other hand, when the variation in the space axis on the ground surface satisfies the second state, the second space-axis filtering unit 22B narrows down all or a portion of the grouping area formed in the plurality of predetermined unit areas satisfying the second state as the sinkage candidate location (step S15).

Next, the third space-axis filtering unit 22C further determines, based on the horizontal direction variation data acquired by the variation data acquisition unit 10 for each predetermined unit time and for each predetermined unit area, whether the variation in the space axis on the ground surface is in the third state in which the grouping areas related to the variation directions in mutually opposite orientations are adjacent to each other (step S16).

Herein, when the variation in the space axis on the ground surface does not satisfy the third state, the process of the flowchart illustrated in FIG. 8 is ended. On the other hand, when the variation in the space axis on the ground surface satisfies the third state, the third space-axis filtering unit 22C predicts all or a portion of the grouping areas formed in the plurality of predetermined unit areas satisfying the third state as the potential sinkage location and performs, for example, the warning (step S17). Accordingly, the process of the flowchart illustrated in FIG. 8 is ended.

It is noted that, as First Modified Example of the sinkage prediction unit 20 according to the first embodiment, in the specific functional configuration of the sinkage prediction unit 20 in FIG. 3, only the first to third time-axis filtering units 21A to 21C of the time-axis filtering unit 21 may be provided. In this case, similarly to the description of FIG. 6, the time-axis filtering unit 21 determines that the portion indicated by reference numeral 61 is in the first state and the third state, determines that the portion indicated by reference numeral 62 is in the second state and the third state, and determines that the portion indicated by reference numeral 63 is in the first state, the second state, and the third state. Then, the time-axis filtering unit 21 extracts, for example, the predetermined unit areas satisfying the first state, the second state, and the third state in the OR condition as the sinkage candidate locations. Alternatively, the time-axis filtering unit 21 can predict the sinkage by extracting only predetermined unit areas satisfying the first state, the second state, and the third state in the AND condition as the sinkage candidate locations.

In addition, as Second Modified Example of the sinkage prediction unit 20 according to the first embodiment, in the specific functional configuration of the sinkage prediction unit 20 in FIG. 3, only the first to third space-axis filtering units 22A to 22C of the space-axis filtering unit 22 may be provided. In this case, similarly to the description of FIG. 7, the space-axis filtering unit 22 can predict the location satisfying all or a portion of the first state, the second state, and the third state as the potential sinkage location. Alternatively, the space-axis filtering unit 22 may warn the location satisfying all of these conditions as the potential sinkage location while presenting the sinkage candidate location satisfying only some of these conditions as a future elapsed observation location.

As described in detail above, in the first embodiment, by analyzing the time-series SAR images measured by using the combined aperture radar, the horizontal direction variation data which is data indicating the time-series variations in the horizontal direction on the ground surface is acquired. Then, it is determined, based on the acquired horizontal direction variation data, whether the variation in the time axis or the variation in the space axis on the ground surface is in the predetermined state and the location on the ground surface where the variation determined as being in the predetermined state is indicated is predicted as the potential sinkage location where there is a possibility of occurrence of the sinkage.

According to the first embodiment configured in this manner, it is possible to predict the location where the sinkage may be likely to occur by determining, based on the time-series horizontal direction variation data obtained by analyzing the SAR image, whether the variation in the time axis or the variation in the space axis on the ground surface is in the predetermined state, by using the predetermined state related to the variation in the horizontal direction viewed on the ground surface where there is a sign that the sinkage is likely to occur as a determination criterion.

In the first embodiment, since the LoS variation data detection unit 13 allows the matching condition to be set to be looser than usual by using the value larger than usual as the threshold value used when matching the north-bound LoS variation data and the south-bound LoS variation data, the loss of the north-bound trajectory LoS variation data and the south-bound trajectory LoS variation data can be reduced, and the north-bound trajectory LoS variation data and the south-bound trajectory LoS variation data can be obtained in the larger number of predetermined unit areas. Accordingly, it is possible to widen the target range where the potential sinkage location can be predicted. In addition, by systematizing with a large number of satellites, that is, by constructing the satellite constellation, it is possible to acquire the large amount of SAR image data, and thus, by acquiring a large number of the north-bound LoS variation data and the south-bound LoS variation data, it is also possible to improve the matching frequency.

In addition, in the first embodiment, the first to third time-axis filtering units 21A to 21C are provided as the time-axis unit 21, respective sinkage filtering candidate locations are extracted from the viewpoints of a change (first state) in the amount of variation for a short term, a change (second state) in the amount of variation for a long term, and a trend (third state) of variation pattern. Accordingly, it is possible to extract the sinkage candidate location from the plurality of viewpoints with respect to the variations in the time axis on the ground surface. When the first state, the second state, and the third state are determined as the OR condition, it is possible to widely extract locations where there is a possibility of occurrence of the sinkage. On the other hand, when the first state, the second state, and the third state are determined as the AND condition, it is possible to narrow down and extract the locations where there is the high possibility of occurrence of the sinkage.

In addition, in the first embodiment, the first space-axis filtering unit 22A is provided as the space-axis filtering unit 22, and among the sinkage candidate locations extracted by the time-axis filtering unit 21, the sinkage candidate locations are narrowed down to the locations within the grouping area formed in the neighboring predetermined unit areas where the ground surface is varied in the same direction. Accordingly, it is possible to extract the sinkage candidate locations by narrowing down to the locations where there is the high possibility of occurrence of the sinkage.

Furthermore, in the first embodiment, the second and third space-axis filtering units 22B and 22C are provided, and in the grouping areas that are spatially expanded in time series, the grouping area where the variation directions are adjacent to each other in mutually opposite orientations is narrowed down to predict the potential sinkage location. Accordingly, it is possible to predict the potential sinkage locations by narrowing down to the locations where the possibility of occurrence of the sinkage is higher, and it is possible to improve the accuracy of prediction.

Second Embodiment

Next, a second embodiment of the invention will be described with reference to the drawings. A functional configuration example of the sinkage prediction device according to the second embodiment is the same as that illustrated in FIG. 1. However, a sinkage prediction unit 20' is provided instead of the sinkage prediction unit 20, and a specific functional configuration of the sinkage prediction unit 20' is different from the functional configuration of the sinkage prediction unit 20 illustrated in FIG. 3.

Figure 9:
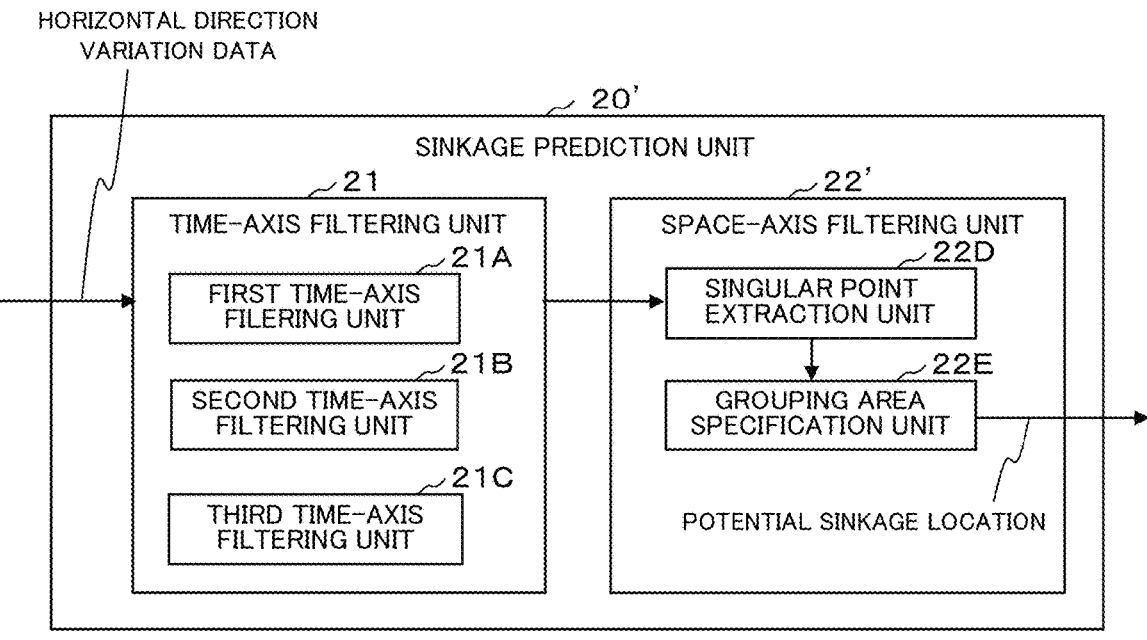
FIG. 9 is a block diagram illustrating a specific functional configuration example of a sinkage prediction unit according to a second embodiment.

FIG. 9 is a block diagram illustrating the specific functional configuration example of the sinkage prediction unit 20' according to the second embodiment. In FIG. 9, the same reference numerals as those illustrated in FIG. 3 have the same functions, and duplicate description is omitted here. As illustrated in FIG. 9, the sinkage prediction unit 20' according to the second embodiment includes, as the functional configuration, a space-axis filtering unit 22' instead of the space-axis filtering unit 22 illustrated in FIG. 3. The space-axis filtering unit 22' includes a singular point extraction unit 22D and a grouping area specification unit 22E.

The singular point extraction unit 22D determines whether the variation trend on the ground surface between the most recent final time point and the past one time point and the variation trend on the ground surface in the past before the past one time point are in a state in which the variation trends are different and extracts, as the singular point, the predetermined unit area determined to be in the state in which the variation trends that are specified before and after the past one time point as a boundary are different.

Figure 10:
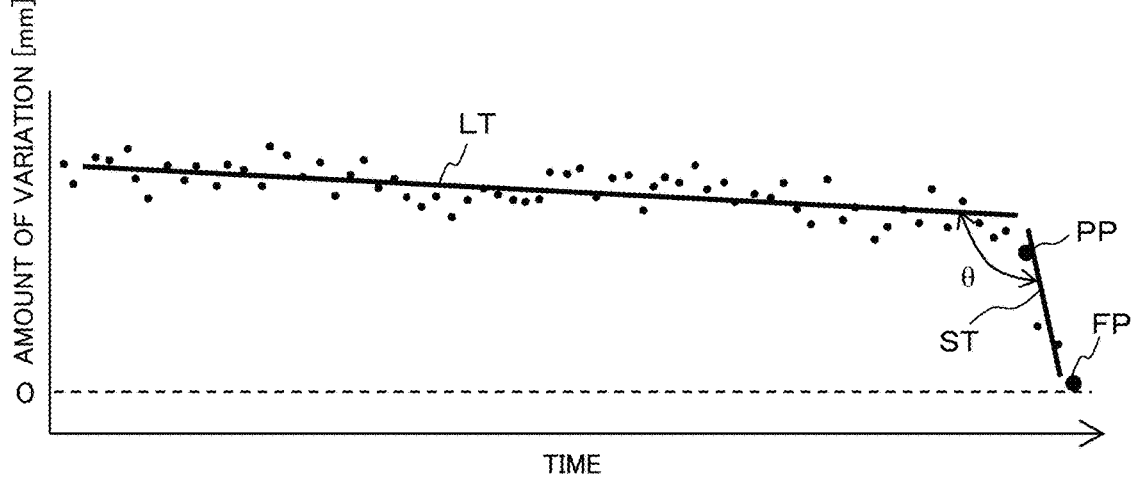
FIG. 10 is a diagram describing processing contents of a singular point extraction unit according to the second embodiment.

FIG. 10 is a diagram illustrating processing contents of the singular point extraction unit 22D. FIG. 10 illustrates a change in the amount of variation on the ground surface in one predetermined unit area for each predetermined unit time (every 11 days) and illustrates the amount of variation due to the horizontal direction variation data with each of circled dots acquired every 11 days. The rightmost dot in FIG. 10 indicates the amount of variation of the most recent final time point FP. In addition, in the example illustrated in FIG. 10, the third dot (the dot before 33 days from the final time point FP) in the past from the final time point FP is set as one time point PP in the past.

The singular point extraction unit 22D determines whether the variation trend on the ground surface between the final time point FP and the one time point PP in the past and the variation trend on the ground surface in the past before the one time point PP in the past are in a state in which the variation trends are different. For example, the singular point extraction unit 22D performs linear approximation including the dot indicating the amount of variation at the final time point FP, the dot indicating the amount of variation at the one time point PP in the past, and the plurality of dots between these dots, and the straight line is specified as the variation trend on the ground surface between the final time point FP and the one time point PP in the past. Hereinafter, this variation trend will be referred to as a short-term trend ST. Similarly, the singular point extraction unit 22D linearly approximates the plurality of dots indicating the amount of variation in the past before the one time point PP in the past, and specifies this straight line as the variation trend on the ground surface in the past before the one time point PP in the past. Hereinafter, this variation trend is referred to as a long-term trend LT. Furthermore, the singular point extraction unit 22D calculates the angle between the straight line indicating the short-term trend ST and the straight line indicating the long-term trend LT as the trend change slope value θ and determines whether this trend change slope value θ exceeds the predetermined value. Then, when the trend change slope value θ exceeds the predetermined value, it is determined that the variation trends (the short-term trend ST and the long-term trend LT) that are specified before and after the past point PP as a boundary are different. In this case, the singular point extraction unit 22D extracts the predetermined unit area of the target determined in this manner as the singular point.

The grouping area specification unit 22E determines whether it is in the predetermined state in which the predetermined unit area where the variation directions face each other at intervals within the first predetermined distance in the same predetermined unit time within the predetermined search target range from the singular point extracted by the singular point extraction unit 22D exists and specifies the grouping areas in the predetermined range including the plurality of predetermined unit areas (hereinafter referred to as facing predetermined unit areas) facing each other so as to satisfy the predetermined state. The first predetermined distance here denotes the distance in the horizontal direction (east-west direction). That is, the facing predetermined unit area is a combination of the predetermined unit area illustrating the east direction variation and the predetermined unit area illustrating the west direction variation at the position within the first predetermined distance therefrom. The grouping area specification unit 22E specifies the grouping area in the predetermined range including the plurality of facing predetermined unit areas configured with such a combination. The sinkage prediction unit 20' predicts the grouping area specified by the grouping area specification unit 22E as the potential sinkage location.

FIGS. 11A to 11D are diagrams illustrating processing contents of the grouping area specification unit 22E. Similarly to FIG. 7, FIGS. 11A to 11D illustrate the variations on the ground surface in the east direction and the west direction in the plurality of predetermined unit areas when the ground surface of a certain area is viewed from above, the orientation of the arrow (the horizontal direction variation data) indicates the variation direction (the east direction and the west direction) on the ground surface, and the amount of variation in the predetermined unit time can be indicated by the difference in the size of the arrow and the color of the arrow. However, for the illustration simplification, the arrows are all the same size and color.

FIGS. 11A to 11D illustrate only the horizontal direction variation data of the sinkage candidate locations extracted by the time-axis filtering unit 21. In other words, the location where no horizontal direction variation data is illustrated is the location where the matching by the LoS variation data detection unit 13 is not satisfied and the north-bound LoS variation data and the south-bound LoS variation data are lost or the location that is not extracted as the sinkage candidate location by the time-axis filtering unit 21. In addition, FIGS. 11A to 11D also illustrate a singular point 111 extracted by the singular point extraction unit 22D.

Figure 11:
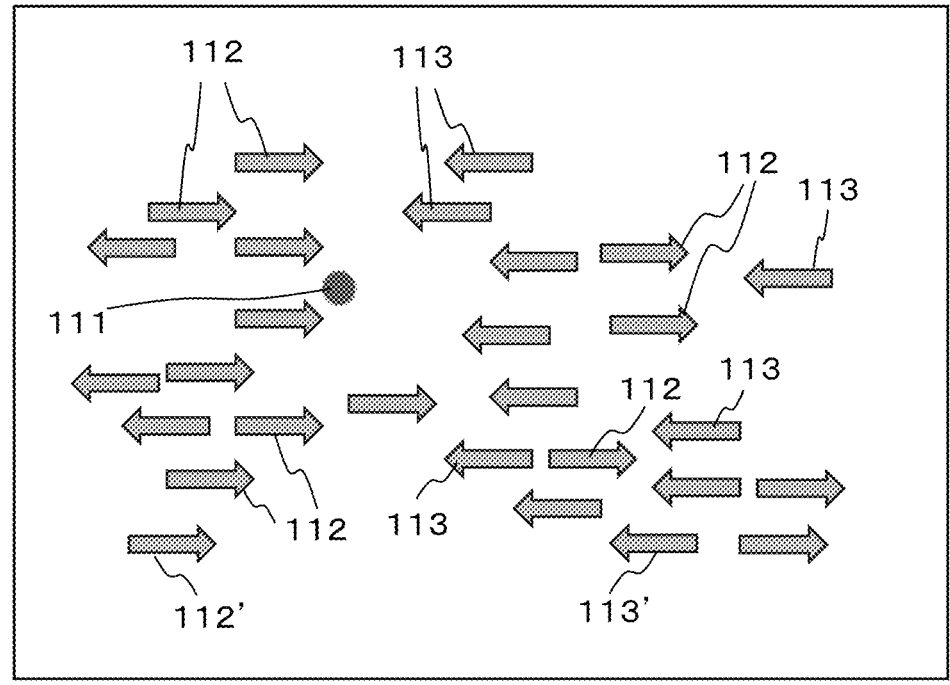
FIG. 11A is a diagram describing processing contents of a grouping area specification unit according to the second embodiment.
FIG. 11B is a diagram describing processing contents of the grouping area specification unit according to the second embodiment.
FIG. 11C is a diagram describing processing contents of the grouping area specification unit according to the second embodiment.
FIG. 11D is a diagram describing processing contents of the grouping area specification unit according to the second embodiment.
Figure 11:
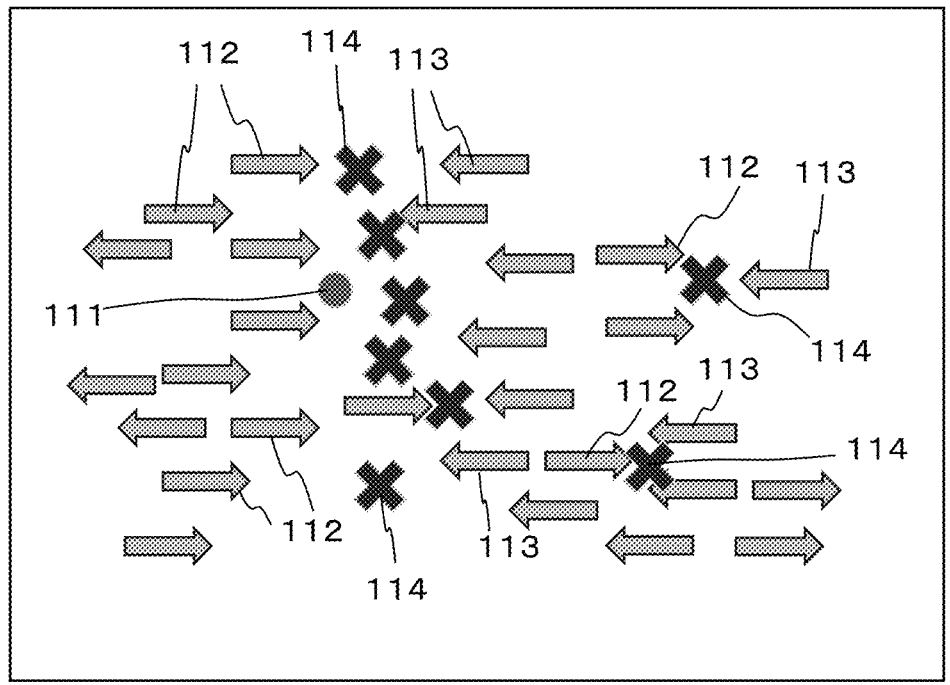
Figure 11:
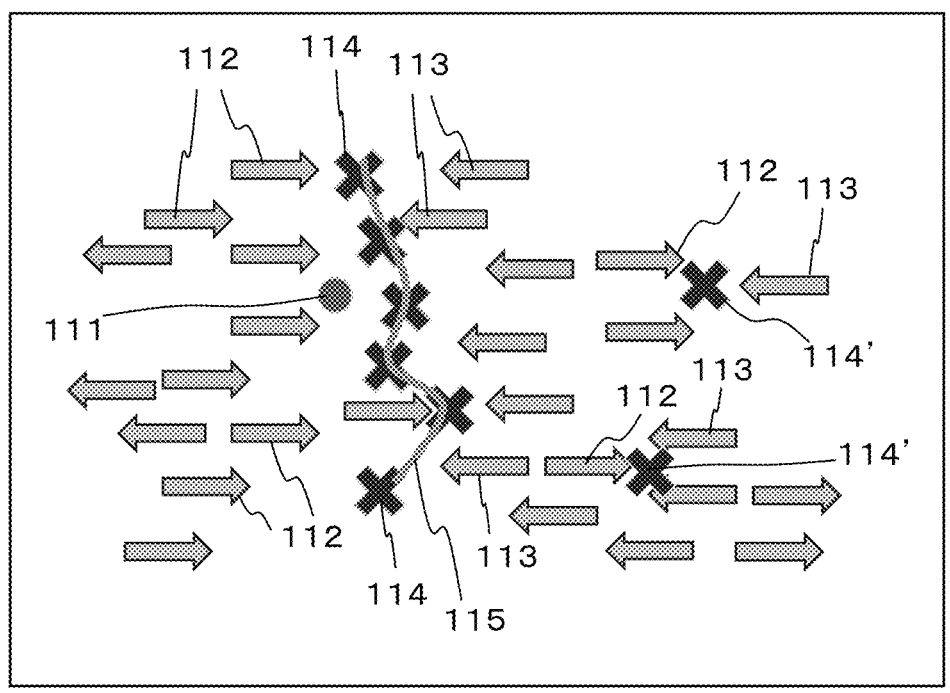
Figure 11:
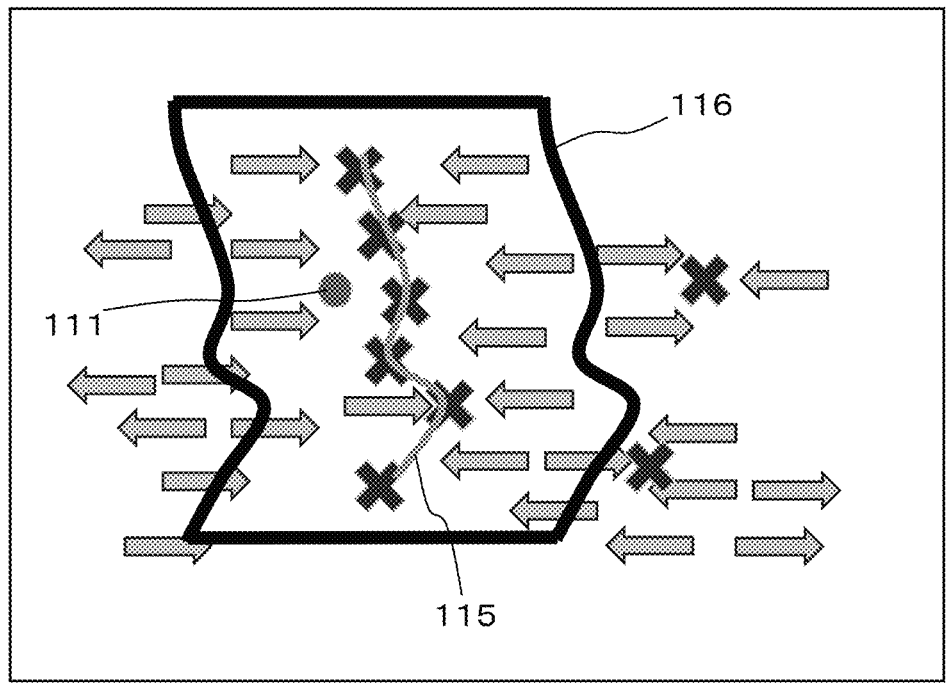

First, as illustrated in FIG. 11A, the grouping area specification unit 22E extracts the predetermined unit areas (facing predetermined unit areas) where the variation directions face each other at the intervals within the first predetermined distance in the same predetermined unit time by using the predetermined search target range (for example, a circular range with the predetermined radius centered on the singular point 111) from the singular point 111 extracted by the singular point extraction unit 22D as a search target. The facing predetermined unit areas is a combination of the predetermined unit area (hereinafter referred to as an east direction variation predetermined unit area) illustrating an east direction variation 112 and the predetermined unit area (hereafter referred to as a west direction variation predetermined unit area) illustrating a west direction variation 113 at the position within the first predetermined distance therefrom. Herein, the positions in the vertical direction of the set of predetermined unit areas extracted as the facing predetermined unit areas may not match completely. That is, when the predetermined unit area for the east direction variation and the predetermined unit area for the west direction variation have the vertical distance within the threshold value, the variation directions opposed to each other at the intervals within the first predetermined distance in the horizontal direction can be extracted as the facing predetermined unit area.

It is noted that, in addition to the predetermined unit areas indicated by reference numerals 112 and 113, FIG. 11A also includes predetermined unit areas corresponding to the facing predetermined unit areas, but for the simple illustration, reference numerals 112 and 113 are omitted for the variation directions of a part of the facing predetermined unit areas. On the other hand, the set of the variation directions indicated by reference numerals 112' and 113' indicates that the variation in the east direction and the variation in the west direction face each other, but since the predetermined unit area of each position does not exist with the horizontal direction distance being within the first predetermined distance, the predetermined unit area does not correspond to the facing predetermined unit area that is an extraction target by the grouping area specification unit 22E.

As illustrated in FIG. 11A, the grouping area specification unit 22E specifies the grouping area in the predetermined range including the extracted facing predetermined unit areas (predetermined unit areas in which the east direction variation 112 and the west direction variation 113 facing each other at intervals within the first predetermined distance) and extracts the grouping area as the potential sinkage location. For example, among the plurality of extracted facing predetermined unit areas, the area having a predetermined shape (for example, a rectangular shape, a circular shape, and the like) including the facing predetermined unit areas existing at the positions close to each other can be specified as the grouping area. In addition, it is also possible to specify the grouping area by the method illustrated in FIGS. 11B to 11D described below.

As illustrated in FIG. 11B, the grouping area specification unit 22E specifies an intermediate point 114 of the facing predetermined unit area (a set of predetermined unit areas extracted as mutually facing the variation directions at the intervals within the first predetermined distance). An example of the intermediate point 114 is a center point of a pair of the facing predetermined unit areas facing each other. The term "a pair of the facing predetermined unit areas facing each other" as used herein does not require that the number of predetermined unit areas varying in the west direction and the number of predetermined unit areas varying in the east direction match each other.

For example, one (hereinafter referred to as the area of interest) of the plurality of predetermined unit areas extracted as the facing predetermined unit areas specified, one or more predetermined unit areas (hereinafter referred to as neighboring facing areas) where the vertical direction distance from the area of interest is within the threshold value are specified among the predetermined unit areas illustrating the variation direction, in opposite orientations, of the specified one area of interest, and the center point of the one area of interest and one or more neighboring facing areas is specified as one intermediate point 114. A plurality of intermediate points 114 are specified as illustrated in FIG. 11B by performing such a process while sequentially setting the plurality of predetermined unit areas extracted the as facing predetermined unit areas as the area of interest. It is noted that the method for specifying the intermediate point 114 described here is merely an example, and the invention is not limited thereto.

Next, as illustrated in FIG. 11C, the grouping area specification unit 22E extracts only the intermediate points 114 existing in the intervals within the second predetermined distance from each other among the plurality of intermediate points 114 extracted as described above and generates a center line 115 by connecting between the plurality of extracted intermediate points 114. The connecting line between the two adjacent intermediate points 114 may be straight or may be curved. The second predetermined distance here is a straight line distance between the two intermediate points 114. Two intermediate points 114' for which the center line 115 is not generated are not extracted as constituents of nodes of the center line 115 because the straight line distance between the two intermediate points 114' is larger than the second predetermined distance.

Finally, as illustrated in FIG. 11D, the grouping area specification unit 22E specifies a grouping area 116 in the predetermined range including the plurality of intermediate points 114 with the center lines 115 generated as illustrated in FIG. 11C. For example, the grouping area specification unit 22E specifies grouping areas 116 in predetermined ranges having boundaries similar in shape to the center line 115 at respective positions that are the third predetermined distance from the center line 115 in the west direction and the east direction and having horizontal boundaries at respective positions that are the fourth predetermined distance in the south direction and the north direction from both ends of the center line 115. This grouping area 116 is a potential sinkage location predicted as the location where the sinkage is likely to occur. It is noted that the method for specifying the grouping area 116 described here is just an example, and the method is not limited thereto.

It is noted that a plurality of singular points 111 may be extracted by the singular point extraction unit 22D. In this case, the grouping area specification unit 22E specifies the plurality of grouping areas 116 in the predetermined range including the predetermined unit area satisfying the predetermined state by performing the processes illustrated in FIGS. 11A to 11D on each of the plurality of singular points 111.

Figure 12:
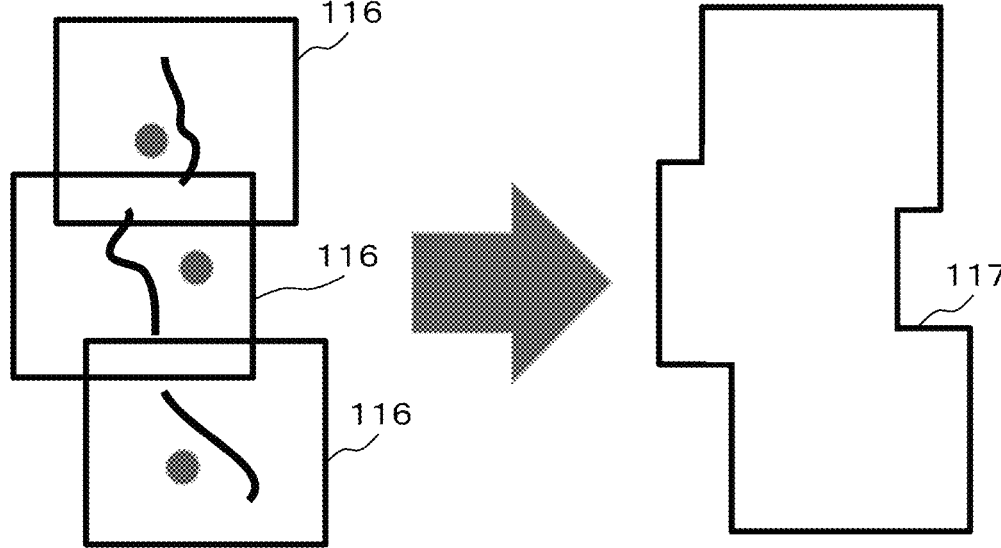
FIG. 12 is a diagram describing processing contents of the grouping area specification unit according to the second embodiment.

Herein, as illustrated in FIG. 12, among the plurality of grouping areas 116 specified from the plurality of singular points 111, grouping areas overlapping each other may be formed into one combined grouping area 117. It is noted that, although the grouping area 116 is simply illustrated as the rectangular area in FIG. 12, the grouping area 116 may be the area as described in FIG. 11D. The same also applies to FIG. 14 described later.

Figure 13:
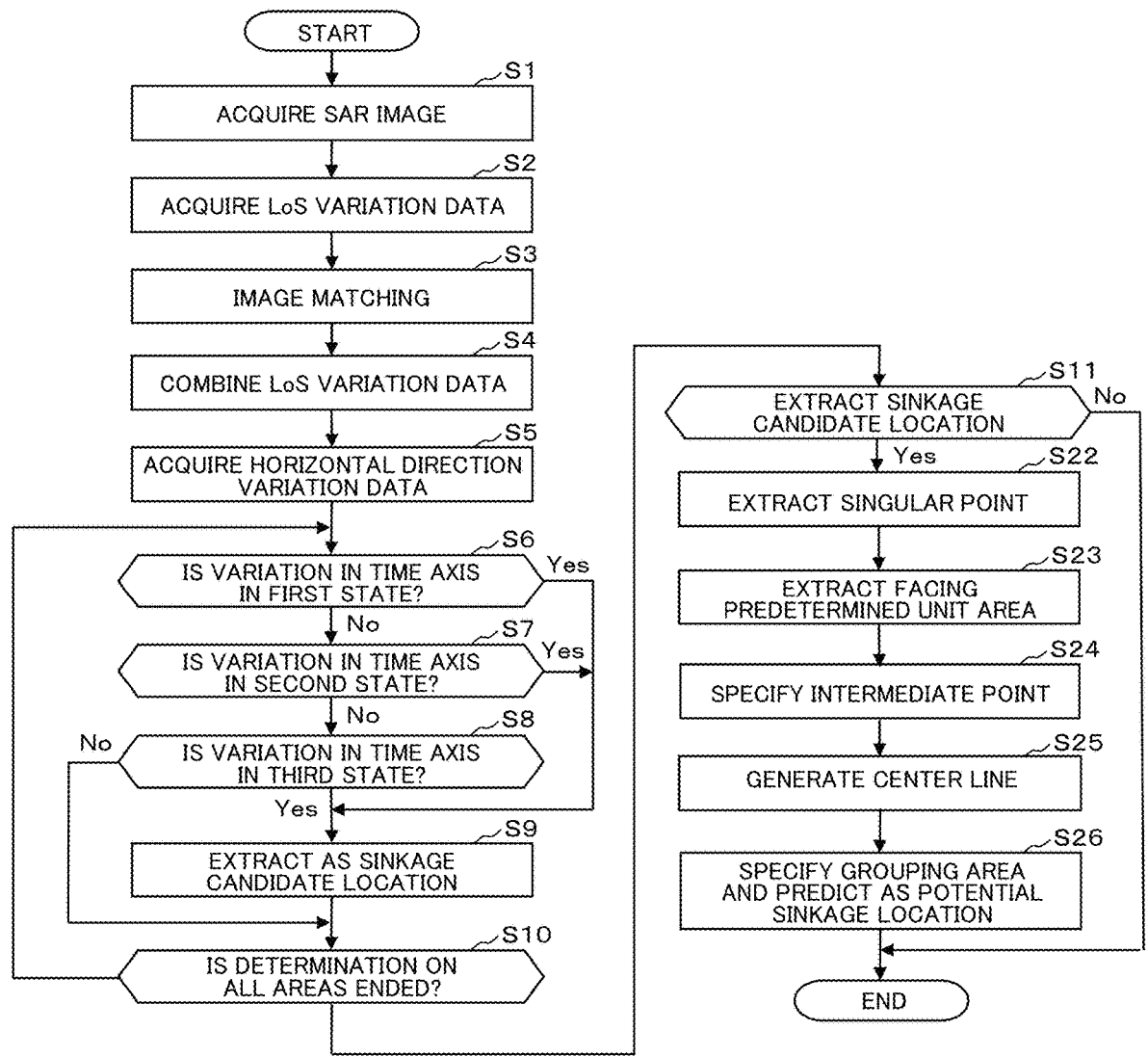
FIG. 13 is a flowchart illustrating an operation example of a sinkage prediction device according to the second embodiment.

FIG. 13 is a flowchart illustrating an operation example of the sinkage prediction device according to the second embodiment configured as described above. In FIG. 13, the processes of steps S1 to S11 are the same as in FIG. 8. When it is determined in step S11 that at least one sinkage candidate location has been extracted, the space-axis filtering unit 22 performs the following processes on the predetermined unit area of the sinkage candidate location extracted by the time-axis filtering unit 21 as the determination target.

First, for each predetermined unit area, the singular point extraction unit 22D extracts, as the singular point 111, the predetermined unit area determined to be in a state in which the variation trends before and after the one time point PP in the past specified as a boundary are different (step S22). Next, the grouping area specification unit 22E extracts the facing predetermined unit area which is a combination of the predetermined unit areas where the variation directions face each other at the intervals within the first predetermined distance in the same predetermined unit time by using a predetermined search target range from the singular point 111 extracted by the singular point extraction unit 22D as a search target (step S23).

Next, the grouping area specification unit 22E specifies the intermediate point 114 of the extracted facing predetermined unit area (step S24). Then, the grouping area specification unit 22E extracts only the intermediate points 114 existing at intervals within the second predetermined distance from each other from among the specified plurality of intermediate points 114 and generates the center line 115 by connecting between the plurality of extracted intermediate points 114 (step S25). Finally, the grouping area specification unit 22E specifies the grouping area 116 in the predetermined range including the center line 115 and outputs the grouping area 116 as the potential sinkage location (step S26). Thus, the process of the flowchart illustrated in FIG. 13 is ended.

According to the second embodiment configured as described above, it is possible to efficiently specify the grouping area 116 in the predetermined range including the facing predetermined unit areas where the variation directions face each other around the singular point 111 where the variation trend of the ground surface changes greatly in the time-axis direction as the potential sinkage location where the possibility of occurrence of the sinkage is considered to be higher. Accordingly, it is possible to efficiently extract the potential sinkage location with high prediction accuracy.

It is noted that, in the second embodiment, the singular point extraction unit 22D extracts the singular point 111 by setting only the one time point PP in the past, but the invention is not limited thereto. For example, the singular point extraction unit 22D may set the plurality of time points as the one time point PP in the past, and for each of the plurality of time points, the singular point extraction unit 22D may determine whether the variation trends before and after the one time point PP in the past specified as a boundary are in a state in which the variation trends are different and may extract, as the singular point 111, the predetermined unit area determined to be in a state in which the variation trends are different. In this case, for example, even if the variation trends on the ground surface specified before and after a first time point PP1 as a boundary are not in a state in which the variation trends are different (the trend change slope value θ is the predetermined value or less), the singular point 111 may be extracted as being in the state in which the variation trends on the ground surface that is specified before and after a second time point PP2 as a boundary are different.

Figure 14:
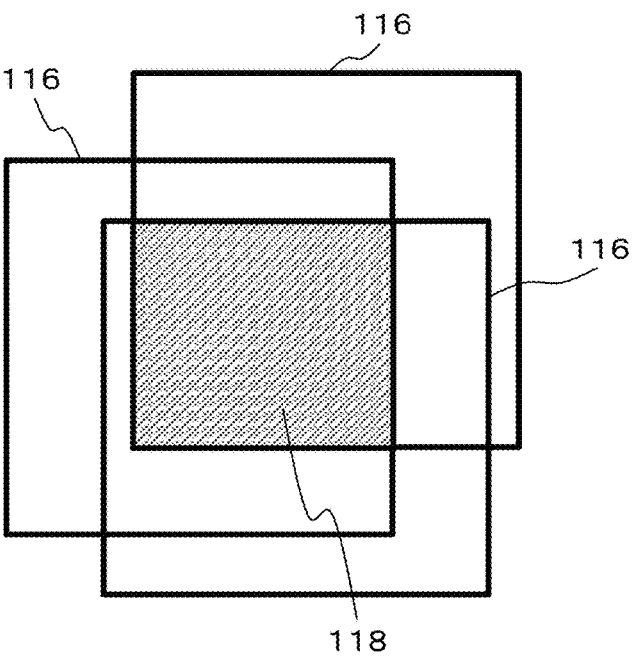
FIG. 14 is a diagram describing processing contents of the grouping area specification unit according to the second embodiment.

When the plurality of singular points 111 are extracted by the singular point extraction unit 22D by setting the plurality of one time points PP in the past, the grouping area specification unit 22E specifies the plurality of grouping areas 116 in the predetermined range including the predetermined unit area satisfying the predetermined state by performing the processes illustrated in FIGS. 11A to 11D on each of the plurality of singular points 111. Herein, as illustrated in FIG. 14, the area where the plurality of grouping areas 116 overlap is specified as an overlapping grouping area 118. The sinkage prediction unit 20' predicts the overlapping grouping area 118 specified in this way as the potential sinkage location. This overlapping grouping area 118 can be said to be the range with the higher degree of certainty as the potential sinkage area. Therefore, by setting the plurality of one time points PP in the past and specifying the overlapping grouping area 118, it is possible to further improve the prediction accuracy of the potential sinkage location.

In addition, in the second embodiment, the time-axis filtering unit 21 may be omitted, and only the space-axis filtering unit 22' may be provided.

Third Embodiment

Next, a third embodiment of the invention will be described with reference to the drawings. A functional configuration example of the sinkage prediction device according to the third embodiment is the same as that illustrated in FIG. 1. However, a sinkage prediction unit 20" is provided instead of the sinkage prediction unit 20, and a specific functional configuration of the sinkage prediction unit 20" is different from the functional configuration of the sinkage prediction unit 20 illustrated in FIG. 3.

Figure 15:
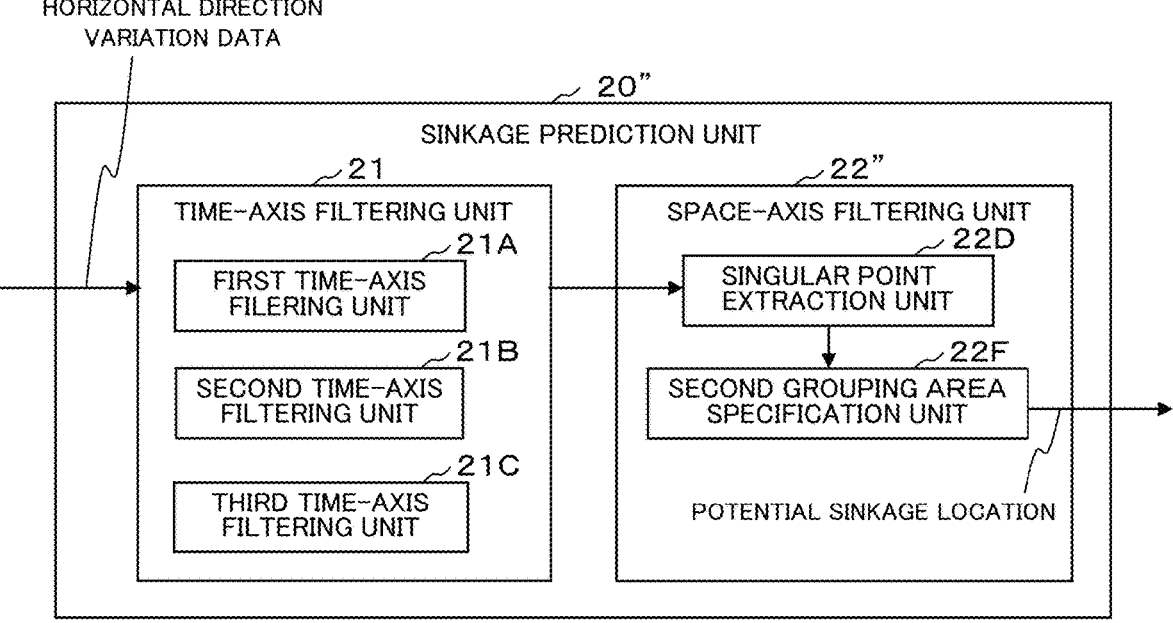
FIG. 15 is a block diagram illustrating a specific functional configuration example of a sinkage prediction unit according to a third embodiment.

FIG. 15 is a block diagram illustrating a specific functional configuration example of the sinkage prediction unit 20" according to the third embodiment. In FIG. 15, the same reference numerals as those illustrated in FIG. 9 have the same functions, and duplicate description is omitted here. As illustrated in FIG. 15, the sinkage prediction unit 20" according to the third embodiment includes, as the functional configuration, a space-axis filtering unit 22" instead of the space-axis filtering unit 22' illustrated in FIG. 9. The space-axis filtering unit 22" includes the singular point extraction unit 22D and a second grouping area specification unit 22F.

The second grouping area specification unit 22F can specify the grouping area formed in the plurality of predetermined unit areas indicating the same variation direction at intervals within the predetermined distance in the same predetermined unit time within the predetermined search target range from the singular point 111 extracted by the singular point extraction unit 22D and determines whether the grouping areas related to the variation directions in mutually opposite orientations are in the state of being adjacent to each other, and specifies the entire grouping areas adjacent to each other so as to satisfy the state as the combined grouping area. The sinkage prediction unit 20" predicts the combined grouping area specified by the second grouping area specification unit 22F as the potential sinkage location.

Figure 16:
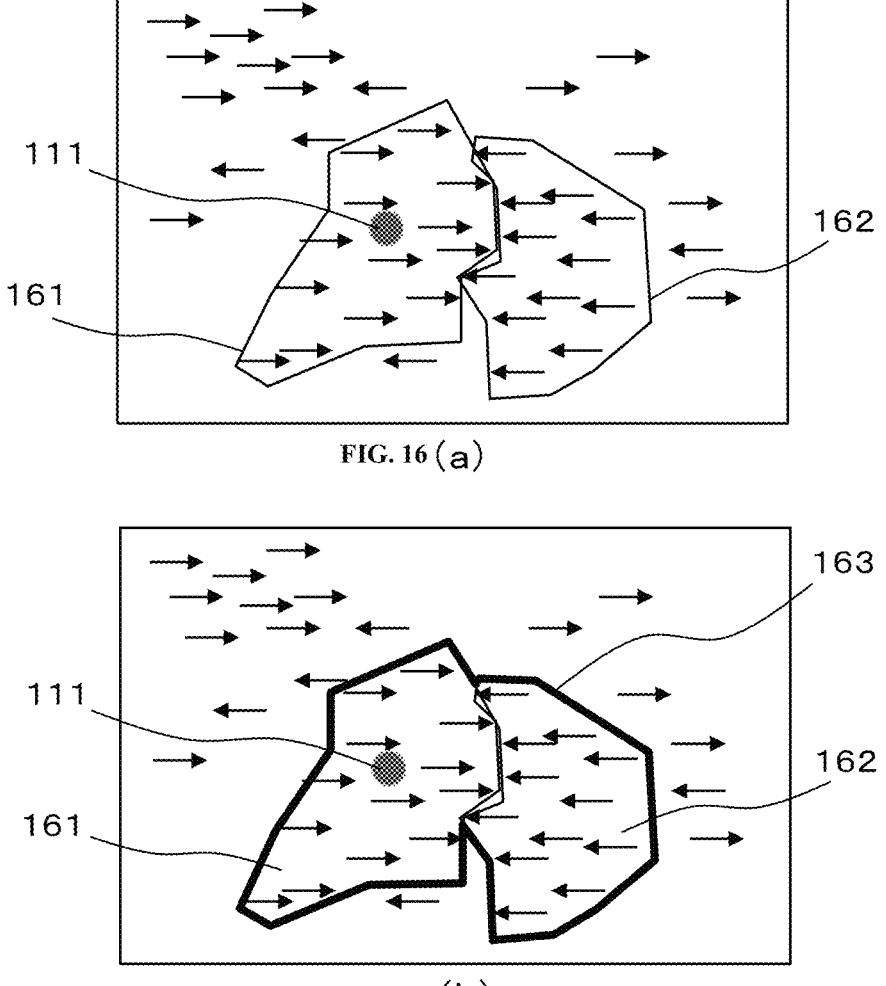
FIG. 16 is a diagram describing processing contents of a second grouping area specification unit according to the third embodiment.

FIG. 16 is a diagram illustrating processing contents of the second grouping area specification unit 22F. Similarly to FIG. 7(*c*), FIG. 16 illustrates the variations on the ground surface in the east direction and the west direction in the plurality of predetermined unit areas when the ground surface of a certain area is viewed from above, the orientation of the arrow (the horizontal direction variation data) indicates the variation direction (the east direction and the west direction) on the ground surface, and the amount of variation in the predetermined unit time can be indicated by the difference in the size of the arrow and the color of the arrow. However, for the illustration simplification, the arrows are all the same size and color.

FIG. 16 illustrates only the horizontal direction variation data of the sinkage candidate locations extracted by the time-axis filtering unit 21. In other words, the location where no horizontal direction variation data is illustrated is the location where the matching by the LoS variation data detection unit 13 is not satisfied and the north-bound LoS variation data and the south-bound LoS variation data are lost or the location that is not extracted as the sinkage candidate location by the time-axis filtering unit 21. In addition, FIG. 16 also illustrates the singular point 111 extracted by the singular point extraction unit 22D.

First, as illustrated in FIG. 16(*a*), the second grouping area specification unit 22F specifies grouping areas 161 and

162 formed in the plurality of predetermined unit areas illustrating the same variation direction at intervals within the predetermined distance from each other in the same predetermined unit time by using a predetermined search target range (for example, a circular range with a predetermined radius from the singular point 111 as a center) from the singular point 111 extracted by the singular point extraction unit 22D as a search target. This process is the same as the process of the first space-axis filtering unit 22A described in the first embodiment.

Next, as illustrated in FIG. 16(*b*), the second grouping area specification unit 22F determines whether the grouping areas 161 and 162 specified as described above are in a state in which the grouping areas related to the variation directions in mutually opposite orientations are adjacent to each other, and when it is determined that the state is satisfied, the second grouping area specification unit 22F specifies all of the adjacent grouping areas 161 and 162 as a combined grouping area 163. This determination is the same as the determination performed by the third space-axis filtering unit 22C described in the first embodiment. The sinkage prediction unit 20″ predicts the combined grouping area 163 specified by the second grouping area specification unit 22F as the potential sinkage location.

Also in the third embodiment configured as described above, it is possible to efficiently specify the combined grouping area 163 in the predetermined range including the facing predetermined unit areas illustrating the variation directions in mutually opposite orientations around the singular point 111 where the variation trend of the ground surface changes greatly in the time-axis direction as the potential sinkage location where the possibility of occurrence of the sinkage is considered to be higher. This makes it possible to efficiently extract the potential sinkage location with high prediction accuracy.

The contents described with reference to FIGS. 12 and 14 can be similarly applied to the third embodiment. In addition, in the third embodiment, the time-axis filtering unit 21 may be omitted, and only the space-axis filtering unit 22″ may be configured to be provided.

It is noted that, in the first to third embodiments, the example of performing predicting the potential sinkage location based on horizontal direction variation data has been described, but the invention is not limited thereto. For example, the sinkage prediction unit 20 may determine, based on the horizontal direction variation data and the vertical direction variation data acquired by the variation data acquisition unit 10, whether the variation in the time-axis or the variation in the space axis on the ground surface is in the predetermined state for each of the horizontal direction and the vertical direction and may predict the location on the ground surface indicating the variation determined to be in the predetermined state for both of the horizontal direction and the vertical direction as the potential sinkage location. The content of the determination based on the vertical direction variation data may be the same as the content of the determination based on the horizontal direction variation data. In this way, it is possible to extract the location with the higher possibility of sinkage, and it is possible to further improve the accuracy of prediction.

In addition, the sinkage prediction unit 20 may predict, based on the north-bound LoS direction variation data, the south-bound LoS direction variation data, the horizontal direction variation data, and the vertical direction variation data acquired by the variation data acquisition unit 10, whether the variation in the time-axis or the variation in the space axis on the ground surface is in the predetermined state for each of the north-bound LoS direction, the south-bound LoS direction, the horizontal direction, and the vertical direction and may predict the location on the ground surface indicating the variation determined to be in the predetermined state for at least one direction of the horizontal direction, the north-bound LoS direction, the south-bound LoS direction, and the vertical direction as the potential sinkage location. The content of the determination performed based on the north-bound LoS variation data and the south-bound LoS variation data may be the same as the content of the determination performed based on the horizontal direction variation data.

In addition, the above-described first to third embodiments are merely examples of specific implementations of the invention, and the technical scope of the invention is not to be construed to be limited by these embodiments. That is, the invention may be implemented in various forms without departing from the spirit or the essential characteristics thereof.

REFERENCE SIGNS LIST

1: sinkage prediction device
10: variation data acquisition unit
11: observation image acquisition unit
12: LoS variation data acquisition unit
13: LoS variation data detection unit
14: variation direction decomposition unit
20, 20′, 20″: sinkage prediction unit
21: time-axis filtering unit
21A: first time-axis filtering unit
21B: second time-axis filtering unit
21C: third time-axis filtering unit
22, 22′, 22″: space-axis filtering unit
22A: first space-axis filtering unit
22B: second space-axis filtering unit
22C: third space-axis filtering unit
22D: singular point extraction unit
22E: grouping area specification unit
22F: second grouping area specification unit

The invention claimed is:
1. A sinkage prediction device comprising:
a variation data acquisition unit analyzing time-series observation data measured by using an earth observation technology and acquiring horizontal direction variation data which is data indicating a horizontal direction variation on a ground surface;
a sinkage prediction unit determining, based on the horizontal direction variation data acquired by the variation data acquisition unit, whether a variation in a space axis on the ground surface is in a predetermined state and predicting a location on the ground surface indicating the variation determined to be in the predetermined state as a potential sinkage location where there is a possibility of occurrence of sinkage,
wherein the variation data acquisition unit acquires a variation direction and an amount of variation on the ground surface as the horizontal direction variation data for each predetermined unit time and for each predetermined unit area,
wherein the sinkage prediction unit includes:
a singular point extraction unit that determines whether, for each of the predetermined unit areas, the variation trend on the ground surface between a most recent final time point and a one time point in the past and the variation trend on the ground surface in the past before the one time point in the past are in a state of being different and extracts, as a singular point, the predetermined unit area determined to be in the state in which the variation trends that are specified before and after the one time point in the past as a boundary are different; and a grouping area specification unit that determines, as the predetermined state, whether it is in a state in which the predetermined unit area where the variation directions face each other at intervals within a first predetermined distance in the same predetermined unit time within the predetermined search target range from the singular point extracted by the singular point extraction unit exists and specifies the grouping area in a predetermined range including the facing predetermined unit area satisfying the state, and wherein the grouping area specified by the grouping area specification unit is predicted as the potential sinkage location.

2. The sinkage prediction device according to claim 1, wherein the grouping area specification unit specifies an intermediate point of the facing predetermined unit areas facing each other, extracts only the intermediate point existing at intervals within the second predetermined distance from each other, and specifies the grouping area in a predetermined range including the extracted intermediate point.

3. The sinkage prediction device according to claim 1, wherein, when the plurality of singular points extracted by the singular point extraction unit exist, the grouping area specification unit performs a process on each of the plurality of singular points to specify the plurality of grouping areas in the predetermined ranges including the predetermined unit area satisfying the predetermined state, and combines the overlapping grouping areas among the plurality of grouping areas.

4. The sinkage prediction device according to claim 1, wherein the singular point extraction unit sets the plurality of time points as the one time point in the past, determines, for each of the plurality of time points, whether the variation trends that are specified before and after the one time point in the past as the boundary are in a state in which the variation trends are different, and extracts, as the singular point, the predetermined unit area determined to be in the state in which the variation trends are different, wherein, when the plurality of the singular points extracted by the singular point extraction unit exist, the grouping area specification unit performs a process on each of the plurality of singular points to specify the plurality of grouping areas in the predetermined ranges including the predetermined unit area satisfying the predetermined state, and specifies the area where the plurality of grouping areas overlap as an overlapping grouping area, and wherein the overlapping grouping area specified by the grouping area specification unit is predicted as the potential sinkage location.

5. A sinkage prediction device comprising:

a variation data acquisition unit analyzing time-series observation data measured by using an earth observation technology and acquiring horizontal direction variation data which is data indicating a horizontal direction variation on a ground surface;

a sinkage prediction unit determining, based on the horizontal direction variation data acquired by the variation data acquisition unit, whether a variation in a time axis or a variation in a space axis on the ground surface is in a predetermined state and predicting a location on the ground surface indicating the variation determined to be in the predetermined state as a potential sinkage location where there is a possibility of occurrence of sinkage, wherein the variation data acquisition unit includes:

an LoS variation data acquisition unit analyzing time-series observation data measured by using the earth observation technology and acquiring north-bound LoS variation data which is data indicating the variation in a line-of-sight direction when the ground surface is viewed from a satellite in which a satellite traveling direction is in a north-bound trajectory and south-bound LoS variation data which is data indicating the variation in the line-of-sight direction when the ground surface is viewed from a satellite in which a satellite traveling direction is in a south-bound trajectory;

an LoS variation data detection unit performing matching between the north-bound LoS variation data and the south-bound LoS variation data acquired by the LoS variation data acquisition unit and detecting matched variation data for each predetermined unit time and for each predetermined unit area; and a variation direction decomposition unit decomposing the north-bound LoS variation data and the south-bound LoS variation data detected by the LoS variation data detection unit as matched data for each predetermined unit time and for each predetermined unit area into horizontal direction variation data which is data indicating horizontal direction variation and vertical direction variation data which is data indicating vertical direction variation, and wherein the sinkage prediction unit determines, based on the north-bound LoS variation data, the south-bound LoS variation data, the horizontal direction variation data, and the vertical direction variation data, whether a variation in a time axis or a variation in a space axis on the ground surface is in the predetermined state for each of the north-bound LoS direction, the south-bound LoS direction, the horizontal direction, and the vertical direction and predicts the location on the ground surface indicating the variation determined to be in the predetermined state for at least one direction of the horizontal direction, the north-bound LoS direction, the south-bound LoS direction, and the vertical direction as the potential sinkage location.

6. The sinkage prediction device according to claim 5, wherein, when detecting the north-bound LoS variation data and the south-bound LoS variation data, the LoS variation data detection unit performs time-axis and space-axis matching between the north-bound trajectory LoS variation data obtained by processing the observation data by the satellite in the north-bound trajectory and the south-bound trajectory LoS variation data obtained by processing the observation data by the satellite in the south-bound trajectory and detects the matched north-bound LoS variation data and south-bound LoS variation data, and wherein at least one of the time-axis threshold value and the space-axis threshold value used when performing the matching is set to be larger than the predetermined value.

7. A sink prediction method, comprising:

a first step of a variation data acquisition unit of a sinkage prediction device analyzing time-series observation data measured by using an earth observation technology and acquiring horizontal direction variation data which is data indicating a horizontal direction variation on a ground surface; and a second step of a sinkage prediction unit of the sinkage prediction device determining, based on the horizontal direction variation data acquired by the variation data acquisition unit, whether a variation in a space axis on the ground surface is in a predetermined state and predicting a location on the ground surface indicating the variation determined to be in the predetermined state as a potential sinkage location where there is a possibility of occurrence of sinkage;

wherein the variation data acquisition unit acquires a variation direction and an amount of variation on the ground surface as the horizontal direction variation data for each predetermined unit time and for each prede-termined unit area in the first step;

wherein the processes of the sinkage prediction unit in the second step includes:

a singular point extraction step determining whether, for each of the predetermined unit areas, the variation trend on the ground surface between a most recent final time point and a one time point in the past and the variation trend on the ground surface in the past before the one time point in the past are in a state of being different and extracting, as a singular point, the predetermined unit area determined to be in the state in which the variation trends that are specified before and after the one time point in the past as a boundary are different;

a grouping area specification step determining, as the predetermined state, whether it is in a state in which the predetermined unit area where the variation directions face each other at intervals within a first predetermined distance in the same predetermined unit time within the predetermined search target range from the singular point extracted in the singular point extraction step exists and specifying the grouping area in a predeter-mined range including the facing predetermined unit area satisfying the state; and a prediction step predicting the grouping area specified in the grouping area specification step as the potential sinkage location.

8. The sinkage prediction device according to claim 2, wherein, when the plurality of singular points extracted by the singular point extraction unit exist, the grouping area specification unit performs a process on each of the plurality of singular points to specify the plurality of grouping areas in the predetermined ranges including the predetermined unit area satisfying the predetermined state, and combines the overlapping grouping areas among the plurality of grouping areas.

9. The sinkage prediction device according to claim 2, wherein the singular point extraction unit sets the plurality of time points as the one time point in the past, determines, for each of the plurality of time points, whether the variation trends that are specified before and after the one time point in the past as the boundary are in a state in which the variation trends are different, and extracts, as the singular point, the predetermined unit area determined to be in the state in which the variation trends are different, wherein, when the plurality of the singular points extracted by the singular point extraction unit exist, the grouping area specification unit performs a process on each of the plurality of singular points to specify the plurality of grouping areas in the predetermined ranges including the predetermined unit area satisfying the predetermined state, and specifies the area where the plurality of grouping areas overlap as an overlapping grouping area, and wherein the overlapping grouping area specified by the grouping area specification unit is predicted as the potential sinkage location.

10. The sinkage prediction device according to claim 3, wherein the singular point extraction unit sets the plurality of time points as the one time point in the past, determines, for each of the plurality of time points, whether the variation trends that are specified before and after the one time point in the past as the boundary are in a state in which the variation trends are different, and extracts, as the singular point, the predetermined unit area determined to be in the state in which the variation trends are different, wherein, when the plurality of the singular points extracted by the singular point extraction unit exist, the grouping area specification unit performs a process on each of the plurality of singular points to specify the plurality of grouping areas in the predetermined ranges including the predetermined unit area satisfying the predetermined state, and specifies the area where the plurality of grouping areas overlap as an overlapping grouping area, and wherein the overlapping grouping area specified by the grouping area specification unit is predicted as the potential sinkage location.

* * * * *